US012529399B2

(12) United States Patent
Bira et al.

(10) Patent No.: US 12,529,399 B2
(45) Date of Patent: Jan. 20, 2026

(54) CLUTCH ASSEMBLIES AND ASSOCIATED METHODS

(71) Applicant: Oregon State University, Corvallis, OR (US)

(72) Inventors: Nicholas Patrick Bira, Cambridge, MA (US); Joseph Ryan Davidson, Corvallis, OR (US); Pallavi Dhagat, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 18/667,994

(22) Filed: May 17, 2024

(65) Prior Publication Data

US 2024/0384764 A1 Nov. 21, 2024

Related U.S. Application Data

(60) Provisional application No. 63/503,323, filed on May 19, 2023.

(51) Int. Cl.
*F16D 37/02* (2006.01)
*F16D 37/00* (2006.01)

(52) U.S. Cl.
CPC ........ *F16D 37/02* (2013.01); *F16D 2037/007* (2013.01)

(58) Field of Classification Search
CPC .......................................... F16D 37/00–37/02
See application file for complete search history.

(56) References Cited

U.S. PATENT DOCUMENTS

| 9,091,309 | B2 | 7/2015 | Battlogg | |
|---|---|---|---|---|
| 10,671,171 | B2 | 6/2020 | Battlogg | |
| 10,784,762 | B1 * | 9/2020 | Grundmann | ......... H02K 49/102 |
| 11,439,521 | B2 | 9/2022 | Battlogg | |
| 2019/0257372 | A1 * | 8/2019 | Plante | ................... F16D 25/126 |
| 2022/0171470 | A1 * | 6/2022 | Drezet | .................... H01F 1/447 |

OTHER PUBLICATIONS

Bira et al., A low-power magnetorheological fluid clutch utilizing electropermanent magnet arrays, Journal Article, Dec. 1, 2022, Front. Mater. 9:1039004, 15 pages.

* cited by examiner

*Primary Examiner* — Richard M Lorence
(74) *Attorney, Agent, or Firm* — Klarquist Sparkman, LLP

(57) ABSTRACT

Clutch assemblies and associated methods are disclosed herein. In an example, a clutch assembly comprise a first terminal, a second terminal, a clutch body enclosing a torque transfer fluid, and one or more electropermanent magnets (EPMs), each configured to generate a respective EPM magnetic field. The clutch assembly is configured to transmit a torque between the first terminal and the second terminal with a torque capacity that is at least partially based on the EPM magnetic fields. In an example, a method of operating a clutch assembly comprises transitioning each of one or more EPMs to a fully depolarized state, a fully polarized state, or an intermediate polarization state. In an example, a method of operating a clutch assembly comprises controlling each of one or more EPMs of the clutch assembly to vary a total EPM magnetic flux generated by the one or more EPMs.

21 Claims, 21 Drawing Sheets

CLUTCH ASSEMBLIES AND ASSOCIATED METHODS

CROSS REFERENCE TO RELATED APPLICATION

This application claims the benefit of U.S. Provisional Patent Application No. 63/503,323, filed May 19, 2023, which is incorporated by reference herein in its entirety.

FIELD

The present disclosure relates generally to clutch assemblies, and more specifically to clutch assemblies utilizing magnetorheological fluids and arrays of electropermanent magnets to produce variable torque transfer characteristics.

BACKGROUND

In robotics, there is widespread interest in expanding physical cooperation between people and robots, a field commonly referred to as physical human robot interaction (pHRI). This interest extends to diverse domains where people may physically wear the robot (e.g., exoskeletons, rehabilitative devices) or work with/around the robot in collaborative spaces (e.g., warehouses, shipping facilities, health care settings).

For applications including pHRI, it is desirable that the robot's design requirements consider safety of the human user. One popular approach for enabling safe and effective pHRI is to add compliance to the robot's actuators. Soft robotics, series elastic actuators, and variable stiffness actuators are some of the methods that can be used to provide compliant actuation for pHRI. Examples of such applications are disclosed in Wolf, S., Grioli, G., Eiberger, O., Friedl, W., Grebenstein, M., Höppner, H., et al. (2016). Variable stiffness actuators: Review on design and components. *IEEE. ASME. Trans. Mechatron.* 21, 2418-2430. doi: 10.1109/TMECH.2015.2501019.

Common implementations of soft robotics and compliant mechanisms utilize deformable materials, such as silicone or other elastomers, in their designs. Flexibility and elasticity improve overall compliance, but constructing robots from these materials often limits the overall strength and speed of a robot. Another method to implement pHRI is with smart materials that respond to specific stimuli to variably change their physical properties. This controllable property enables many control strategies, such as variable stiffness joints in actuated linkages, variable grip strength, and conformal grasping. Examples of such control strategies are disclosed in Bira, N., Dhagat, P., and Davidson, J. R. (2022). Tuning the grasping strength of soft actuators with magnetic elastomer fingertips. *Smart Mat. Struct.* 31, 045013. doi: 10.1088/1361-665x/ac57b1.

SUMMARY

Clutch assemblies and associated methods are disclosed herein.

In a representative example, a clutch assembly comprise a first terminal, a second terminal, a clutch body enclosing a torque transfer fluid, and one or more electropermanent magnets (EPMs). Each EPM is configured to generate a respective EPM magnetic field that extends through the clutch body. The clutch assembly is configured to transmit a torque between the first terminal and the second terminal with a torque capacity that is based, at least in part, on the EPM magnetic fields.

In another representative example, a method of operating a clutch assembly comprises transitioning each of one or more EPMs of the clutch assembly to a respective EPM operative state, which is one of (i) a fully depolarized state, in which a magnitude a respective EPM magnetic field is a minimum EPM magnetic field magnitude; (ii) a fully polarized state, in which the magnitude the respective EPM magnetic field is a maximum EPM magnetic field magnitude; and (iii) an intermediate polarization state, in which the magnitude of the respective EPM magnetic field is between the minimum EPM magnetic field magnitude and the maximum magnetic field magnitude.

In another representative example, a method of operating a clutch assembly comprises controlling each of one or more EPMs of the clutch assembly to vary a total EPM magnetic flux generated by the one or more EPMs and extending through a magnetorheological fluid of the clutch assembly.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, claims, and accompanying figures.

DETAILED DESCRIPTION

Figure 1:
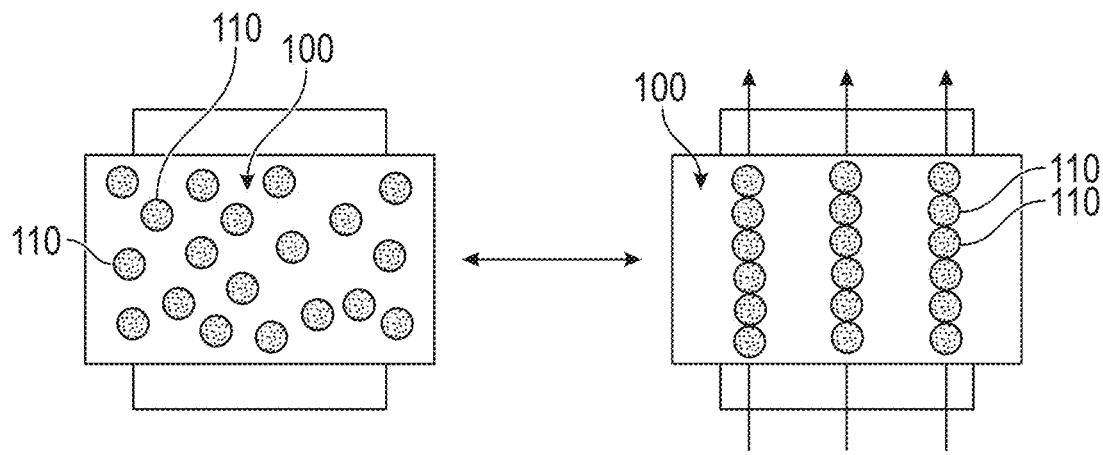
FIG. 1 is an illustration of the principle of magnetorheological fluids according to an example.

The present disclosure generally is directed to clutch mechanisms that utilize magnetorheological fluids and electropermanent magnets to produce variable torque transfer characteristics, and associated methods. As discussed in more detail below, clutch mechanisms according to the present disclosure can enable an effective stiffness of the clutch mechanism to be selectively and dynamically varied in an energy-efficient manner. Such clutch mechanisms thus may be particularly applicable to the field of physical human robot interaction (pHRI).

General Considerations

For purposes of this description, certain aspects, advantages, and novel features of examples of this disclosure are described herein. The disclosed methods, apparatus, and systems should not be construed as being limiting in any way. Instead, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present or problems be solved.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function, but rather that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function additionally or alternatively may be described as being configured to perform that function, and vice versa. Similarly, subject matter that is recited as being configured to perform a particular function additionally or alternatively may be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); and in yet another example, to both A and B (optionally including other entities). These entities may refer to elements, actions, structures, steps, operations, values, and the like.

As used herein, the phrase "at least one," in reference to a list of one or more entities, should be understood to mean at least one entity selected from any one or more of the entities in the list of entities, but not necessarily including at least one of each and every entity specifically listed within the list of entities and not excluding any combinations of entities in the list of entities. This definition also allows that entities optionally may be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one example, to at least one, optionally including more than one, A, with no B present (and optionally including entities other than B); in another example, to at least one, optionally including more than one, B, with no A present (and optionally including entities other than A); and in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure. In this manner, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present or problems be solved.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

As used herein, the term "diametrically opposed," as used to describe a position, location, and/or configuration of a second component relative to a first component, refers to a configuration in which the first component and the second component are positioned on opposite sides of a center of symmetry and/or rotation such that a straight line connecting the first component and the second component also passes through the center of symmetry and/or rotation.

Although the operations of some of the disclosed examples are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

Introduction to the Disclosed Technology

A magnetorheological fluid (MRF) is a smart material that variably alters its shear behavior in the presence of an externally applied magnetic field. For example, and as shown in FIG. 1, an MRF 100 can contain small ferromagnetic particles 110 (e.g., iron) in suspension that create the magnetic response. In the absence of an applied magnetic field (FIG. 1, left), the ferromagnetic particles 110 are randomly distributed in the MRF 100, and the MRF 100 behaves as a liquid with low viscosity. Such a state may be described as an "inactive" state of the MRF. In the presence of an applied magnetic field (FIG. 1, right), the ferromagnetic particles 110 assemble to align and form polymer-like chains in such a manner that the MRF 100 flows with a greater resistance after an initial yield stress defined by the magnetic field intensity. Such a state may be described as an "active" state of the MRF. In particular, the MRF in the active state may be described as behaving like a Bingham plastic in the manner descried in "Fluidity and Plasticity" by E. C. Bingham (New York, United States: McGraw-Hill, 1922).

Since MRF requires magnetic fields of magnitudes considered safe for human exposure and demonstrates rapid response times, it is an appealing candidate for pHRI applications (see Shafer, A. S., and Kermani, M. R. (2009). "On the feasibility and suitability of mr and er based actuators in human friendly manipulators," in Proceedings of the 2009 IEEE/RSJ International Conference on Intelligent Robots and Systems (IEEE), St. Louis, MO, USA, 10-15 Oct. 2009, 2904-2909).

An MRF reacts to an applied magnetic field rapidly and reversibly, and since the intensity of magnetic fields can be selectively controlled by electromagnets, this fluid has been deployed in the development of MRF-based actuators, brakes, clutches, dampers, and valves (see Phu, D. X., and Choi, S.-B. (2019). Magnetorheological fluid based devices reported in 2013-2018: Mini-review and comment on structural configurations. *Front. Mat.* 6, 19. doi: 10.3389/fmats.2019.00019).

A suction-based flexible gripper was developed using MRF and a controllable magnetic field, achieving improved grip strength while the magnetic field is active (see Koivikko, A., Drotlef, D.-M., Sitti, M., and Sariola, V. (2021). Magnetically switchable soft suction grippers. *Extreme Mech. Lett.* 44, 101263. doi: 10.1016/j.eml.2021.101263).

Another study designed a laparoscopic actuator with MRF and electromagnets to control the joint stiffness between each link and alter its curvature (see Kitano, S., Komatsuzaki, T., Suzuki, I., Nogawa, M., Naito, H., and Tanaka, S. (2020). Development of a rigidity tunable flexible joint using magneto-rheological compounds-Toward a multijoint manipulator for laparoscopic surgery. *Front. Robot. AI* 7, 59. doi: 10.3389/frobt.2020.00059).

Another recent article developed a hybrid MRF and shape-memory alloy (SMA) linkage (see Yang, J., Sun, S., Yang, X., Ma, Y., Yun, G., Chang, R., et al. (2022). Equipping new SMA artificial muscles with controllable MRF exoskeletons for robotic manipulators and grippers. *IEEE. ASME. Trans. Mechatron.*, 1-12. doi: 10.1109/TMECH.2022.3157329). In this work, the SMAs are deployed along the length of the linkage, while each joint of the linkage consists of an MRF-filled bearing which responds to an electromagnet coil adjacent to it to increase local joint stiffness.

Substantial prior work also has been directed to the use of MRF-based clutch mechanisms for transmitting torque between robotic linkages. One paper characterized an MRF clutch and modeled how the input magnetic field maps to an output torque, highlighting how MRF clutches can control the amount of transmitted torque through the intensity of the applied field (see Yadmellat, P., and Kermani, M. R. (2013). Adaptive modeling of a magnetorheological clutch. *IEEE. ASME. Trans. Mechatron.* 19, 1716-1723. doi: 10.1109/tmech.2013.2292594).

Other researchers developed a small-scale MRF clutch and compared it to that of a traditional DC motor for potential use in haptic feedback systems (see Najmaci, N., Kermani, M. R., and Patel, R. V. (2014). Suitability of small-scale magnetorheological fluid-based clutches in haptic interfaces for improved performance. *IEEE. ASME. Trans. Mechatron.* 20, 1863-1874. doi: 10.1109/tmech.2014.2357447).

Another publication developed and characterized a five degree-of-freedom robotic arm with MRF clutches in each joint. In this work, electromagnets were used in conjunction with a permanent magnet to control a specific range of magnetic field to variably control the joint stiffness at each joint (see Pisetskiy, S., and Kermani, M. (2021). High-performance magneto-rheological clutches for direct-drive actuation: Design and development. *J. Intelligent Material Syst. Struct.* 32, 2582-2600. doi: 10.1177/1045389x211006902).

A recent article developed an upper leg prosthesis, combining a MRF clutch with an MRF brake to provide improved energy efficiency compared to a motor-reducer for walking (see de Andrade, R. M., Martins, J. S. R., Pinotti, M., Filho, A. B., and Vimieiro, C. B. S. (2021). Novel active magnetorheological knee prosthesis presents low energy consumption during ground walking. *J. Intelligent Material Syst. Struct.* 32, 1591-1603. doi: 10.1177/1045389X20983923). Later work by the same authors focused on the backdrivability of the MRF clutch in a leg exoskeleton, demonstrating its useful properties compared to traditional designs (see Andrade, R. M., Ulhoa, P. H. F., and Vimieiro, C. B. S. (2022). "Designing a highly backdrivable and kinematic compatible magneto-rheological knee exoskeleton," in 2022 International Conference on Robotics and Automation (ICRA), Philadelphia, PA, USA, 23-27 May 2022, 5724-5730. doi: 10.1109/ICRA46639.2022.9812308).

In general, desirable properties of clutch mechanisms include small physical size, reduced complexity where possible, low power consumption, and high accuracy in the desired torque being transmitted to allow for reliable and predictable behavior. While an industrial manufacturing robot is less constrained by size and power concerns than a small, mobile robot, these design considerations apply in most circumstances.

One significant drawback of MRF devices utilizing conventional electromagnets is substantial power consumption—continuous use of relatively large currents is required to maintain the magnetic fields needed to keep the fluid in the active state. This constraint limits the potential for untethered, remote operation and suggests that innovations in how the magnetic field is created and controlled can improve the utility of MRF devices.

Figure 2:
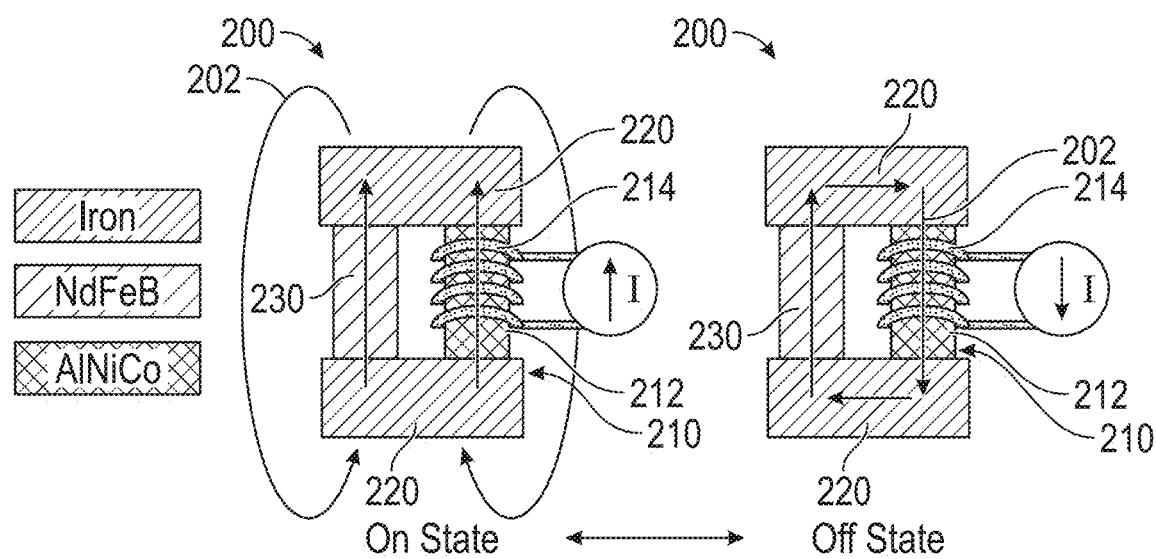
FIG. 2 is an illustration of the principle of an electropermanent magnet according to an example.

Electropermanent magnets (EPMs) offer an alternative mechanism for magnetic field generation for use in conjunction with MRF mechanisms. As an example, FIG. 2 illustrates an EPM 200, which is an assembly of an electromagnet 210 and a hard permanent magnet 230 nearby (e.g., NdFEB). The electromagnet 210 includes a magnetic core 212 (e.g., AlNiCo) and a winding 214 through which an electric current may be passed in one of two directions. The electromagnet 210 and the permanent magnet 230 are connected with pieces of a soft magnetic material 220 (e.g., ferromagnetic iron or steel), and this connection enables the shaping of magnetic flux in the magnetic circuit.

As shown in FIG. 2, the electromagnet 210 can be supplied with a pulse of a switching current through the winding 214 in a positive direction (left-hand side of FIG. 2) or a negative direction (right-hand side of FIG. 2) to magnetize the electromagnet 210 in either direction. The resulting assembly of magnets and iron components thus is configurable between two states, on or off, which represent the net magnetic flux present in the desired region when the magnetic circuit is at rest after polarization of the electromagnet 210. Stated differently, the EPM 200 may be described as being in the on state when or after a switching current pulse is delivered to the winding 214 in the positive direction, and the EPM 200 may be described as being in the off state when or after a switching current pulse is delivered to the winding 214 in the negative direction.

As shown in FIG. 2, when the EPM 200 is in the on state, the magnetic moments of the electromagnet 210 and the permanent magnet 230 are aligned (e.g., parallel), and the magnetic circuit flux lines extend exteriorly of the EPM 200. When the EPM is in the off state, the magnetic moments of the electromagnet 210 and the permanent magnet 230 are directed in opposite directions (e.g., antiparallel), and the magnetic circuit flux lines are at least substantially confined within the EPM 200.

The on state illustrated in the left-hand side of FIG. 2 may be described as representing a "fully on" state, while the off state illustrated in the right-hand side of FIG. 2 may be described as representing a "fully off" state. In particular, the fully on state and the fully off state may correspond to respective extremes of the polarization configuration of the EPM, and/or may correspond respectively to the maximum and minimum magnetic fields that can be generated by the EPM during operative use thereof. In various examples, however, an EPM also may be brought to an "intermediate state" defined between the fully on state and the fully off state, such as by applying a switching current pulse for a duration less than that needed to switch the EPM between the fully on and fully off states. For simplicity, and unless otherwise stated, references herein to the on state or the off state of an EPM are to be understood as referring to the fully on state and the fully off state, respectively.

When in an intermediate state, the EPM can generate a nonzero magnetic field that is less than the magnitude of such a field generated when the EPM is in the fully on state. As discussed in more detail below, such variation of the magnetic field generated by an EPM can produce a corresponding variation in the torque transmitted by an MRF exposed to such a field, offering a control mechanism for clutch assemblies including such components.

In the present disclosure, an EPM (e.g., the EPM 200) may be described as being "polarized" when in the on state, and/or as being "unpolarized" when in the off state. In particular, an EPM may be described as being "fully polarized" when in the fully on state, as being "fully depolarized" when in the fully off state, and/or as being "partially polarized" when in an intermediate state as described above. Additionally, in the present disclosure, a temporal duration of each switching current pulse may be described as a "polarization time." As used herein, the magnetization and/or polarization state of a given EPM (e.g., the fully on state, the fully off state, the fully polarized state, the fully depolarized state, and/or any intermediate state defined therebetween) also may be referred to herein as the operative state of the given EPM.

The use of EPMs to control the state of an MRF also can enable very energy-efficient control strategies. For example, when no current is being applied and the EPM is a rest, the EPM retains its magnetization state and has a constant magnetic flux. This control method is possible due to the coercivity of the AlNiCo magnetic core being much smaller than that of NdFEB (Hc_AlNiCo«Hc_NdFeB). Toggling the magnetization of the AlNiCo still requires power in the form of the electrical switching current pulse delivered to the electromagnet winding, but such toggling can include supplying the switching current pulse for a duration on the order of milliseconds, after which the EPM may be held a "latched" state (e.g., the on state, the off state, or any intermediate state). By contrast, a traditional iron-core electromagnet may require continuous current delivery to maintain a specific magnetic configuration. This low-power switching property renders EPMs and associated devices particularly suitable for untethered operation, as the overall power consumption is reduced compared to always-on devices.

Prior work has demonstrated that EPMs are viable control tools for MRF-related actuation strategies. For example, prior work has developed a MRF valve for low-power, distributed control of flowing MRF in soft robotic systems (see, e.g., Leps, T., Glick, P., Ruffatto, D., III, Parness, A., Tolley, M., and Hartzell, C. (2020). A low-power, jamming, magnetorheological valve using electropermanent magnets suitable for distributed control in soft robots. Smart Mat. Struct. 29, 105025. doi: 10.1088/1361-665x/abadd4). Similarly, recent research with MRF valves demonstrated control over the flow of MRF through a series of soft robotic actuators using EPMs, generating bending in the actuators by building pressure behind an EPM-based valve (see McDonald, K. J., Kinnicutt, L., Moran, A. M., and Ranzani, T. (2022). Modulation of magnetorheological fluid flow in soft robots using electropermanent magnets. IEEE Robot. Autom. Lett. 7, 3914-3921. doi: 10.1109/LRA.2022.3147873). This prior work highlights the significance of EPMs as latching, low-power devices, and their capacity to be used with MRF for controlling actuators. Additional prior work has developed a soft robotic gripper which uses electropermanent magnets as the control input, combined with magnetic elastomers which deform in the presence of a magnetic field to create actuation (see Zhang, P., Kamezaki, M., He, Z., Sakamoto, H., and Sugano, S. (2021). Epm-mre: Electropermanent magnet-magnetorheological clastomer for soft actuation system and its application to robotic grasping. IEEE Robot. Autom. Lett. 6, 8181-8188. doi: 10.1109/LRA.2021.3100939). Other prior work has developed a MRF clutch that uses a single permanent magnet in conjunction with an electromagnet, to modulate the overall field within the clutch and the resulting transmitted torque (see Moghani, M., and Kermani, M. R. (2019). A lightweight magnetorheological actuator using hybrid magnetization. IEEE. ASME. Trans. Mechatron. 25, 76-83. doi: 10.1109/tmech.2019.2951340). This is not an EPM, however, since it does not represent latching on or off-states, but instead requires active input to raise or lower the effective output of the permanent magnet.

With these recent developments in mind, the present disclosure is directed to a clutch assembly with an MRF whose torque-transfer properties are selectively modulated via an EPM array. Such clutch assemblies offer a low-power density method for variably adjusting output torque in a repeatable and programmable manner with a compact form factor.

Examples of the Disclosed Technology

Figure 3:
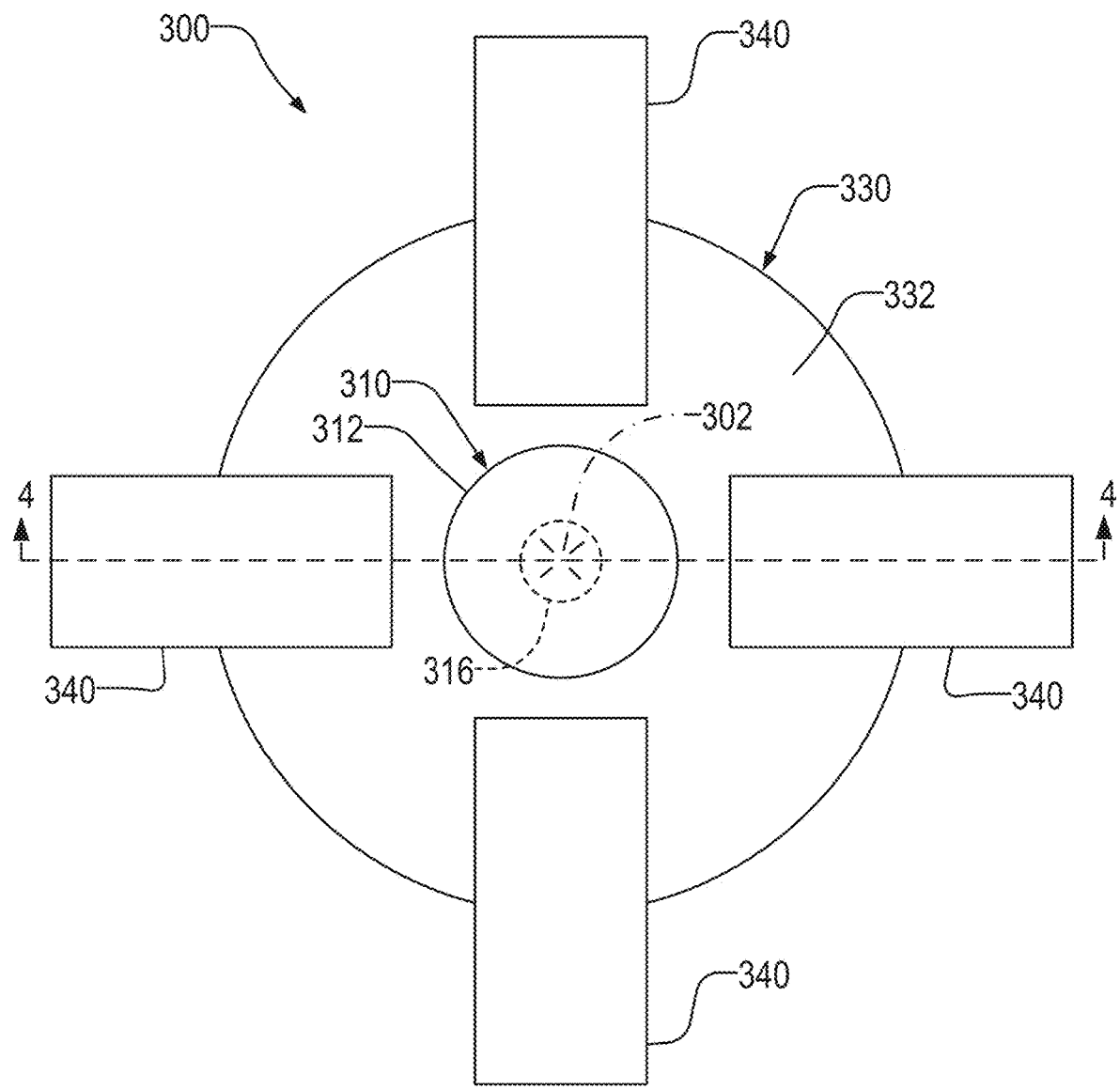
FIG. 3 is a schematic top plan view of a clutch assembly according to an example.
Figure 4:
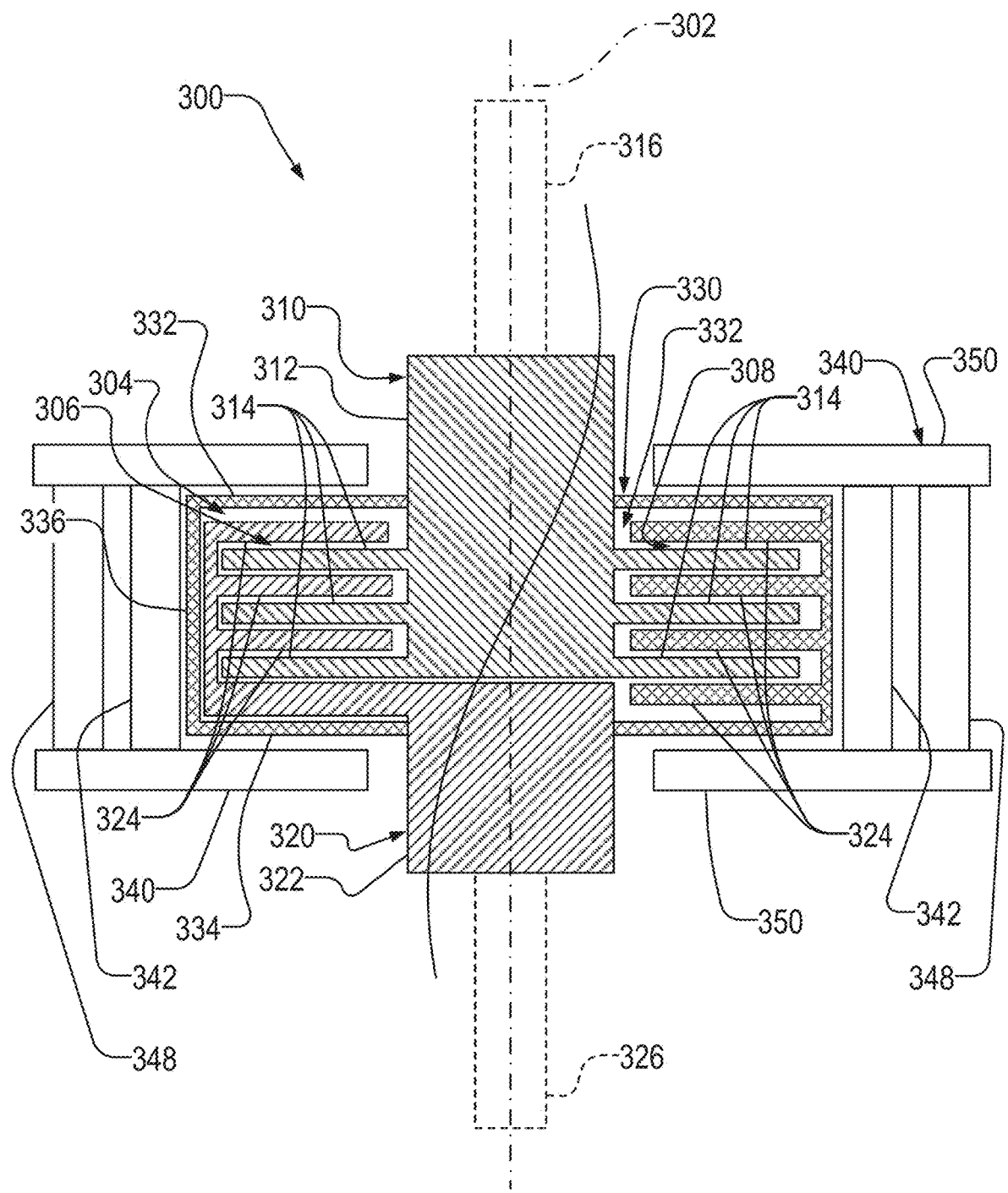
FIG. 4 is a schematic cross-sectional side elevation view of the clutch assembly of FIG. 3 as viewed along the line 3-3 in FIG. 3.

FIGS. 3-4 are schematic top and side views, respectively, of an example of a clutch assembly 300 according to the present disclosure. In particular, FIG. 4 represents a cross-sectional view of the clutch assembly 300 as viewed along the line 3-3 in FIG. 3. In the present disclosure, the clutch assembly 300 also may be referred to as an MRF-EPM clutch (MEC) 300.

As shown in FIGS. 3-4, the clutch assembly 300 includes a first terminal 310, a second terminal 320, and a clutch body 330. The clutch body 330 at least partially defines an enclosed volume 306 that contains a torque transfer fluid 304, which may include and/or be an MRF. Accordingly, in the present disclosure, the torque transfer fluid 304 also may be referred to as an MRF 304. The torque transfer fluid 304 can operate in a similar manner as the MRF 100 of FIG. 1 as discussed above. The first terminal 310, the second terminal 320, and the clutch body 330 are differently shaded in FIG. 4 for clarity.

The clutch assembly 300 generally is configured to transmit a torque between the first terminal 310 and the second terminal 320. In particular, in a given operational configuration, the first terminal 310 and the second terminal 320 can be configured to rotate in unison to transmit a torque up to a threshold torque value at which the first terminal 310 and the second terminal 320 are at least partially rotationally uncoupled from one another. As used herein, the term "terminal" is intended to refer to any component, or collection of components, that operates to receive, deliver, and/or transmit a torque, such as by rotating relative to one or more other components of the clutch assembly 300. For example, the first terminal 310 and/or the second terminal 320 may be configured to be operatively coupled to respective external components, assemblies, systems, etc. to couple such elements to one another via the clutch assembly 300. Accordingly, as used herein, the term "terminal" may be replaced with terms such as "clutch coupling," "rotational member," "torque transfer component," etc. As examples, the first terminal 310 additionally or alternatively may be referred to as a first clutch coupling 310, a first rotational member 310 and/or a first torque transfer component 310.

As shown in FIG. 4, each of the first terminal 310 and the second terminal 320 can extend at least partially along a central axis 302 of the clutch assembly 300. In this example, each of the first terminal 310 and the second terminal 320 is configured to rotate (e.g., relative to the clutch body 330 and/or relative to one another) about the central axis 302.

As described in more detail below, the clutch assembly 300 is configured to selectively transmit torque between the first terminal 310 and the second terminal 320 by selectively transitioning the torque transfer fluid 304 between the inactive state and the active state. In particular, when the torque transfer fluid 304 is in the active state, the first terminal 310 and the second terminal 320 may be rotationally coupled to one another via the torque transfer fluid 304. Alternatively, when the torque transfer fluid 304 is in the inactive state, the first terminal 310 and the second terminal 320 may be at least substantially rotationally decoupled from one another.

The clutch assembly 300 additionally includes a plurality of EPMs 340 circumferentially distributed around the clutch body 330 (as shown in FIG. 3). In the present disclosure, the plurality of EPMs 340 also may be referred to as an array of EPMs 340. As shown in FIG. 4, and similar to the EPM 200 of FIG. 2, each EPM 340 includes an electromagnet 342, a permanent magnet 348, and a pair of soft magnetic plates 350 interconnecting the electromagnet 342 and the permanent magnet 348. In particular, in this example, one soft magnetic plate 350 is coupled (e.g., affixed and/or otherwise joined) to one end of the electromagnet 342 and of the permanent magnet 348, and the other soft magnetic plate 350 is coupled to the other end of the electromagnet 342 and of the permanent magnet 348.

In some examples, and as shown in FIG. 4, the clutch assembly 300 can include a first surface 332 and second surface 334 opposite the first surface 332. The clutch assembly 300 further may include a side surface 336 extending between and interconnecting the first surface 332 and the second surface 334. In the examples disclosed herein, each of the first surface 332 and the second surface 334 is a generally planar surface extending perpendicular to the central axis 302, while the side surface 336 is a substantially annular surface interconnecting the first surface 332 and the second surface 334. Such a configuration is not required, however, and it additionally is within the scope of the present disclosure that the clutch body 330 can have any other suitable shape.

In the example of FIG. 4, the clutch body 330 includes each of the first surface 332, the second surface 334, and the side surface 336. In other examples, the first terminal 310 may include the first surface 332, and/or the second terminal 320 may include the second surface 334.

In the example of FIG. 4, one soft magnetic plate 350 of each EPM 340 is positioned adjacent to and/or in contact with the first surface 332, while the other soft magnetic plate 350 of each EPM 340 is positioned adjacent to and/or in contact with the second surface 334. In this example, the electromagnet 342 and the permanent magnet 348 of each EPM are positioned radially exterior of the side surface 336.

The clutch assembly 300 may include any suitable number of EPMs 340. For example, while FIG. 3 illustrates an example in which the clutch assembly 300 includes four EPMs 340, it also is within the scope of the present disclosure that the clutch assembly 300 can include fewer or more than four EPMs 340. In some examples, using a greater number of EPMs 340 can enable control of the torque transfer characteristics of the clutch assembly 300 with finer degree of precision and/or granularity, and/or can facilitate transfer of a greater torque magnitude. Alternatively, using a lesser number of EPMs 340 may be desirable to limit the overall cost, weight, size, complexity, etc. of the clutch assembly 300.

As discussed herein, each EPM 340 may be individually addressed and/or controlled to generate a respective EPM magnetic field that extends through the clutch body 330. Accordingly, the total magnetic flux generated by the EPMs and extending through the clutch body 330 may be referred to herein as a total EPM magnetic flux, which may represent the sum of the magnetic fluxes corresponding to the EPM magnetic fields of the EPMs 340.

While the present disclosure generally relates to examples in which the EPMs 340 are evenly circumferentially distributed around the central axis 102 (e.g., in an axially symmetric manner), this is not required of all examples. For example, it additionally is within the scope of the present disclosure that the EPMs 340 can be positioned in an axially asymmetric manner with respect to the central axis 102.

As discussed above with reference to FIG. 2, each EPM 340 is switchable between an on state and an off state via delivery of a switching current pulse to the electromagnet 342. When in the on state, each EPM 340 can generate a magnetic field that extends through the clutch body 330 to transition the torque transfer fluid 304 to the active state. Alternatively, when the torque transfer fluid 304 is not subjected to a magnetic field (e.g., when each EPM 340 is in the off state), the torque transfer fluid 304 is in the inactive state.

In an ideal case, when the torque transfer fluid 304 is in the active state, the torque transfer fluid 304 can operatively couple the first terminal 310 and the second terminal 320 to one another such that the first terminal 310 and the second terminal 320 rotate in unison to transmit any magnitude of torque. In practice, however, the extent to which the clutch assembly 300 can transmit torque from the first terminal 310 to the second terminal 320 is limited by the shear strength of the torque transfer fluid 304 in the active configuration and/or the extent to which the torque transfer fluid 304 is in the active configuration. Accordingly, clutch assemblies according to the present disclosure (e.g., the clutch assembly 300) may be characterized in terms of a maximum torque that can be transferred through the clutch assembly 300 without slippage of the second terminal 320 relative to the first terminal. As described in more detail below, this maximum torque transfer generally depends upon a variety of parameters; accordingly, the effects of such parameters on the torque transfer characteristics of the clutch assembly 300 generally are described herein in terms of the maximum torque that can be transferred for a particular operative configuration. For simplicity, as used herein, this maximum torque transfer capability generally is referred to herein as the transmitted torque corresponding to a particular operative configuration. Additionally or alternatively, this maximum torque transfer capability may be referred to as a torque capacity of the clutch assembly in the particular operative configuration.

The torque transfer capability of the clutch assembly 300 (e.g., in a given operative configuration) may be described as depending upon an overall and/or average coupling rigidity (e.g., shear strength) of the torque transfer fluid 304, which in turn generally depends upon a total and/or average magnetic flux extending through the clutch body 330. Accordingly, the torque transfer characteristics of the clutch assembly 300 may be selectively and dynamically varied via variation of the magnetic flux extending through the clutch body 330. As described in more detail below, such control may be achieved in any of a variety of manners, such as by activating a selected subset of the EPMs 340 and/or by transitioning each EPM 340 to an intermediate state characterized by a selected generated magnetic field.

As discussed above, clutch assembly 300 is configured to selectively transmit torque between the first terminal 310 and the second terminal 320. For example, the first terminal 310 may be an input terminal to which an input torque is applied, and the second terminal 320 may be an output terminal to which an output torque is delivered. In such examples, the clutch assembly 300 can selectively and/or dynamically vary the output torque produced at the second terminal 320 for a given input torque produced at the first terminal 310 via control of the EPMs 340. Such a configuration is not required, however, and it additionally is within the scope of the present disclosure that the second terminal 320 may be the input terminal and the first terminal 310 may be the output terminal. Accordingly, descriptions herein of features and/or characteristics of the first terminal 310 additionally or alternatively may be understood as pertaining to the second terminal 320, and vice-versa.

The clutch assembly 300 may have any of a variety of features and/or configurations to rotationally couple the first terminal 310 and the second terminal 320 to one another when the torque transfer fluid 304 is in the active state. As an example, and as shown in FIG. 4, the first terminal 310 can include one or more first terminal discs 314 extending within the enclosed volume 306 of the clutch body 330, while the second terminal 320 can include one or more second terminal discs 324 extending within the enclosed volume 306. In the present disclosure, each first terminal disc 314 and/or each second terminal disc 324 additionally or alternatively may be described as a fin. Additionally or alternatively, each first terminal disc 314 also may be referred to as an inner fin 314 and/or an inner disc 314, while each second terminal disc 324 also may be referred to as an outer fin 324 and/or an outer disc 324.

Each first terminal disc 314 can be positioned adjacent to one or more corresponding second terminal discs 324 to define a torque transfer region 308 therebetween, within which the torque transfer fluid 304 extends and/or flows. Accordingly, when the torque transfer fluid 304 is in the active state, the torque transfer fluid 304 within each torque transfer region 308 operatively couples the corresponding first terminal disc 314 and second terminal disc 324 to one another (up to a yield shear stress of the torque transfer fluid 304) such that rotation of the first terminal discs 314 causes a corresponding rotation of the second terminal discs 324. Alternatively, when the torque transfer fluid 304 is in the inactive state, the torque transfer fluid 304 within each torque transfer region 308 behaves as a low-viscosity liquid, and the first terminal discs 314 and the second terminal discs 324 are free to rotate relative to one another.

As shown in FIG. 4, the clutch assembly 300 may be configured such that the first terminal discs 314 and the second terminal discs 324 are interleaved with one another. Such a configuration is not required, however, and it additionally is within the scope of the present disclosure that the first terminal discs 314 and the second terminal discs 324 can have any suitable positional relationship to one another to form torque transfer regions 308 as described herein.

In some examples, and as shown in FIG. 4, the first terminal 310 includes a first terminal hub 312 and each of the first terminal discs 314 is fixedly coupled to the first terminal hub 312. For example, each first terminal disc 314 may be operatively coupled to the first terminal hub 312 or may be integrally formed with the first terminal hub 312. In the example of FIG. 4, each first terminal disc 314 extends from the first terminal hub 312 radially away from the central axis 302.

In the example of FIG. 4, the first terminal hub 312 extends partially into the clutch body 330 and partially exterior of the clutch body 330 and is configured to rotate relative to the clutch body 330. This is not required, however, and it additionally is within the scope of the present disclosure that the first terminal hub 312 may extend at least substantially and/or fully within the clutch body 330.

In some examples, and as shown in FIGS. 3-4, the first terminal 310 additionally may include a first terminal shaft 316 extending away from the first terminal hub 312 and/or along the central axis 302, such as to facilitate delivery of the input torque to the clutch assembly 300.

Similarly, in some examples, and as shown in FIG. 4, the second terminal 320 includes a second terminal hub 322 and each of the second terminal discs 324 is fixedly coupled to the second terminal hub 322. For example, each second terminal disc 324 may be operatively coupled to the second terminal hub 322 or may be integrally formed with the second terminal hub 322. In the example of FIG. 4, each second terminal disc 324 extends from the second terminal hub 322 radially toward the central axis 302.

In the example of FIG. 4, the second terminal hub 322 extends partially into the clutch body 330 and partially exterior of the clutch body 330. This is not required, however, and it additionally is within the scope of the present disclosure that the second terminal hub 322 may extend at least substantially and/or fully within the clutch body 330.

In some examples, and as shown in FIG. 4, the second terminal 320 additionally may include a second terminal shaft 326 extending away from the second terminal hub 322 and/or along the central axis 302, such as to facilitate delivery of the output torque from the clutch assembly 300.

In some examples, the second terminal hub 322 and/or the second terminal discs 324 may be configured to rotate relative to the clutch body 330. For example, and as shown in FIG. 4 on the left-hand side of the cut line, each second terminal disc 324 may be spaced apart from the clutch body 330 and/or may be supported by a portion of the second terminal hub 322 that is spaced apart from the clutch body 330. Accordingly, in such examples, each of the first terminal 310 and the second terminal 320 may be configured to rotate about the central axis 102 while the clutch body 330 remains rotationally stationary.

This is not required of all examples, however, and it additionally is within the scope of the present disclosure that the second terminal 320 and/or the second terminal hub 322 may be fixedly coupled to the clutch body 330. For example, and as shown in FIG. 4 on the right-hand side of the cut line, each second terminal disc 324 may be fixedly coupled to (e.g., operatively coupled to and/or integrally formed with) the clutch body 330 such that rotation of the second terminal discs 324 about the central axis 302 corresponds to rotation of the clutch body 330 about the central axis 302. In such examples, the second terminal 320 and/or the second terminal hub 322 may be described as including the clutch body 330, and/or vice-versa. Moreover, in some examples, the second terminal 320 may not include any second terminal discs 124, and each torque transfer region 308 can instead extend between each first terminal disc 314 and an inner surface of the clutch body 330.

The clutch assembly 300 may include any suitable number of first terminal discs 314 and of second terminal discs 324. As examples, the first terminal 310 may include one first terminal disc 314, two first terminal discs 314, three first terminal discs 314, four first terminal discs 314, five first terminal discs 314, or more than five first terminal discs 314. Similarly, the second terminal 320 may include one second terminal disc 324, two second terminal discs 324, three second terminal discs 324, four second terminal discs 324, five second terminal discs 324, or more than five second terminal discs 324. In some examples, the number of first terminal discs 314 is equal to the number of second terminal discs 324. In other examples, the clutch assembly 300 can include more first terminal discs 314 that second terminal discs 324 or vice-versa.

Each EPM 340 can have any of a variety of configurations for selectively generating a magnetic field within the enclosed volume 306. For example, in the example of FIGS. 3-4, each soft magnetic plate 350 extends away form the electromagnet 342 and the permanent magnet 348, such as along a direction perpendicular to the central axis 302. In this manner, each soft magnetic plate 350 can be described as operating as a pole piece to direct the magnetic field generated by the electromagnet 342 and the permanent magnet 348 through the clutch body 330 even when the electromagnet 342 and the permanent magnet 348 are positioned radially exteriorly of the clutch body 330.

FIGS. 5-9 illustrate aspects of a clutch assembly 400, which may be regarded as an example of the clutch assembly 300 of FIGS. 3-4. The clutch assembly 400 can include any suitable components, features, characteristics, etc. of the clutch assembly 300, and corresponding components of the clutch assembly 300 and of the clutch assembly 400 may be represented by like reference numerals. As an example, the clutch body 430 of the clutch assembly 400 may share any suitable features with the clutch body 330 of the clutch assembly 300. As another example, and with reference to FIG. 7, the clutch assembly 400 includes an MRF 404 within the enclosed volume 406, which may be analogous to and/or the same as the torque transfer fluid 304 of the clutch assembly 300. It is to be understood that such correspondences can apply to components that are labeled but not specifically discussed in the present disclosure.

Figure 5:
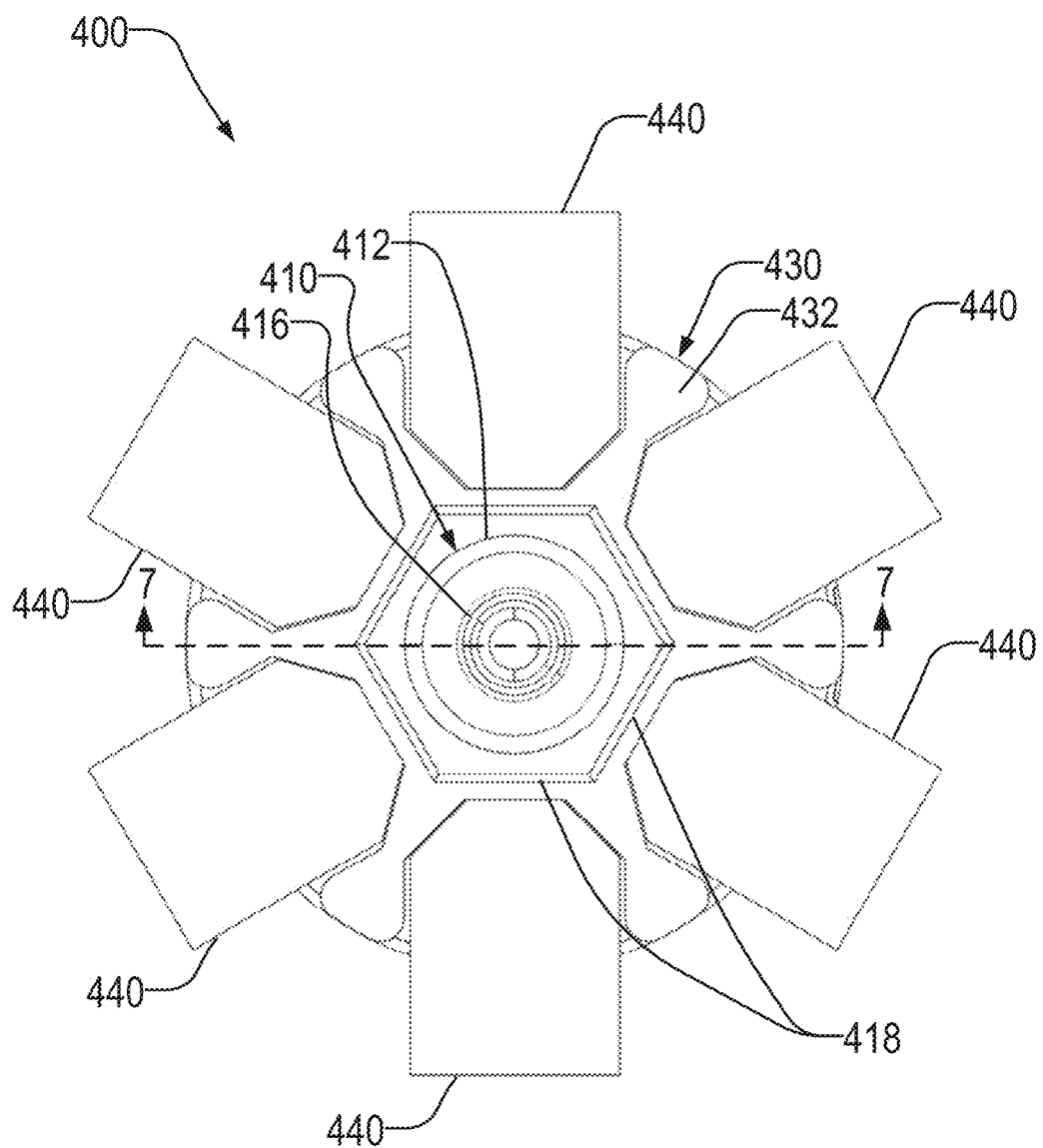
FIG. 5 is a top plan view of a clutch assembly according to another example.
Figure 6:
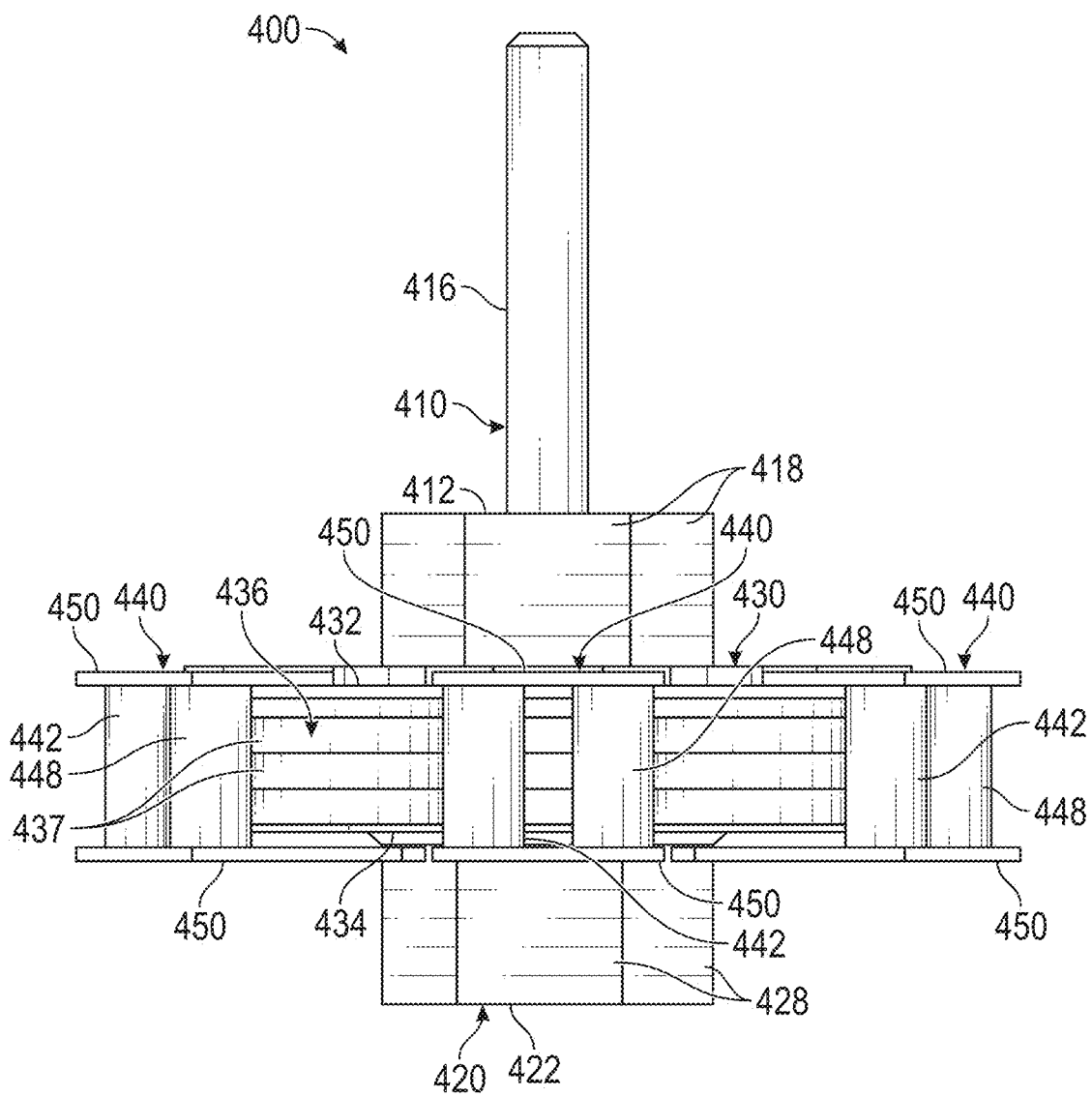
FIG. 6 is a side elevation view of the clutch assembly of FIG. 5.
Figure 7:
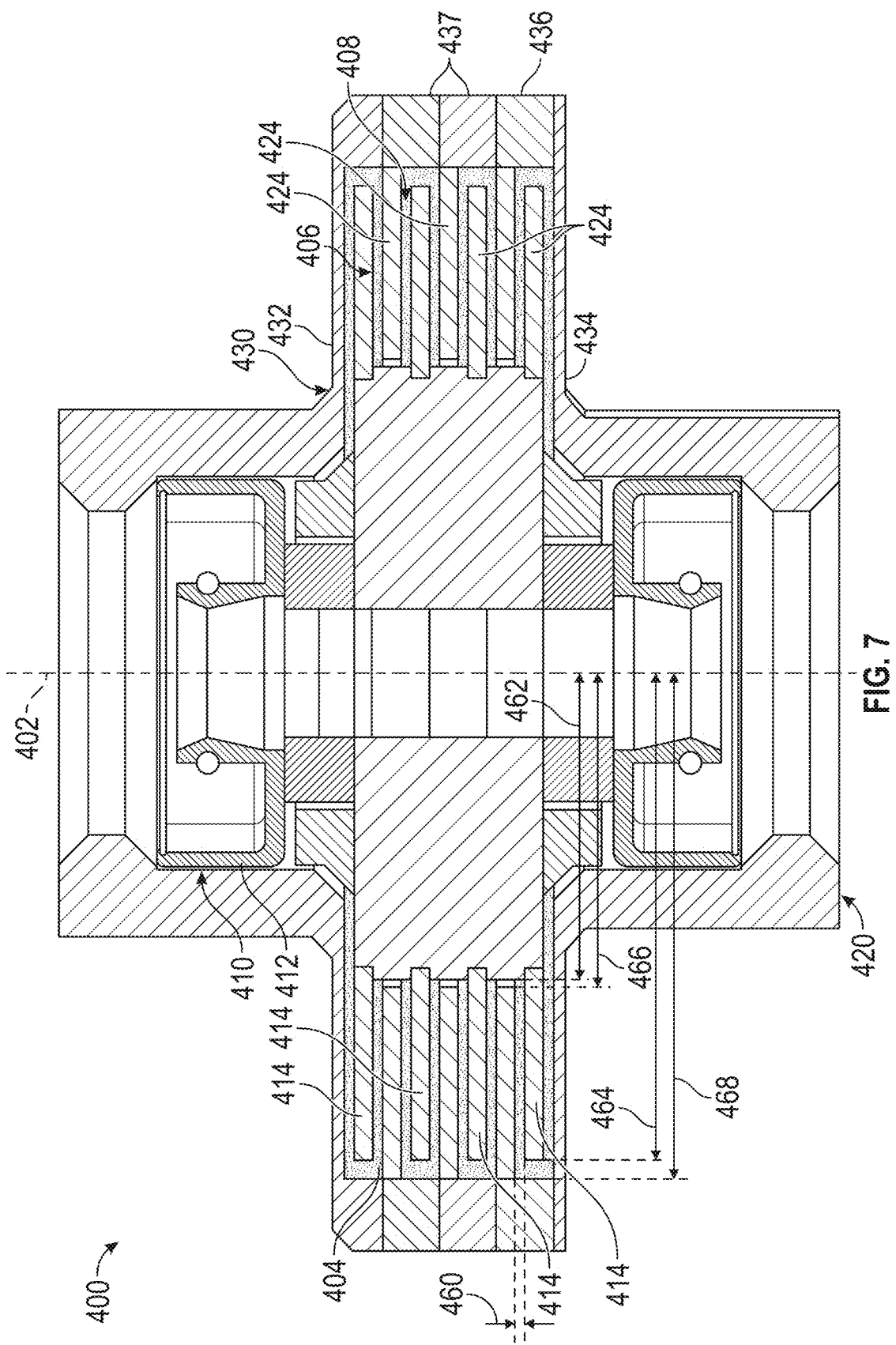
FIG. 7 is a cross-sectional side elevation view of a portion of the clutch assembly of FIG. 5 as viewed along the line 7-7 in FIG. 5.
Figure 8:
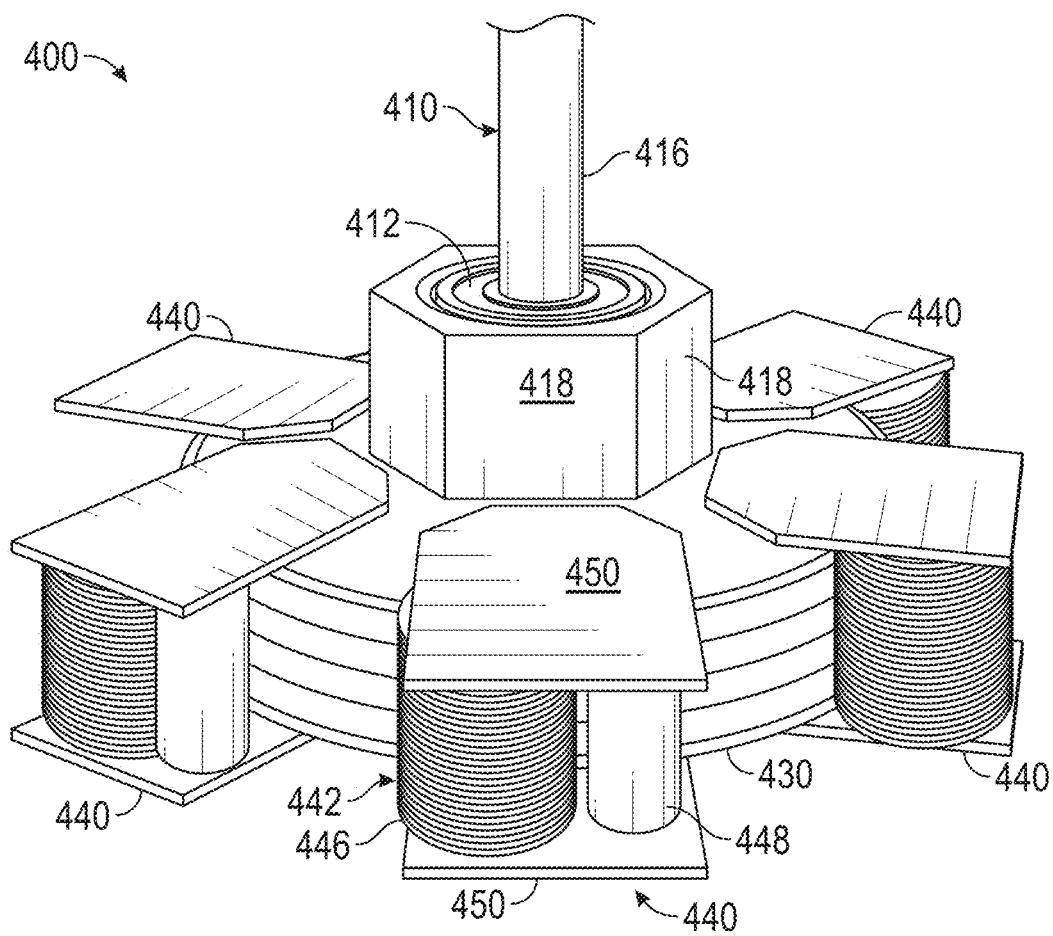
FIG. 8 is a top side perspective view of the clutch assembly of FIG. 5.
Figure 9:
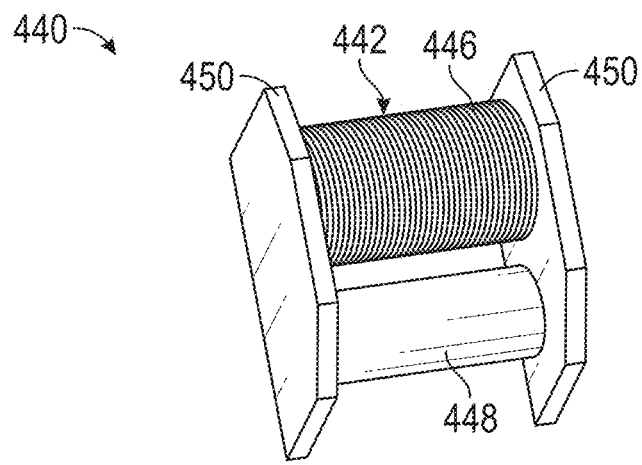
FIG. 9 is a side view of an electropermanent magnet of the clutch assembly of FIG. 5.

FIG. 5 is a top view of the clutch assembly 400, while FIG. 6 is a side view of the clutch assembly 400, and FIG. 7 is a cross-sectional side view of the clutch assembly 400 as viewed along the line 7-7 in FIG. 5. As shown in FIG. 5, the clutch assembly 400 includes six EPMs 440.

Various properties of the clutch assembly 400 may be characterized and/or described in terms of dimensions of various components of the clutch assembly 400. For example, with reference to FIG. 7, each first terminal disc 414 is spaced apart from each adjacent second terminal disc 424 by a disc gap 460, such as may be measured along a direction parallel to the central axis 402. Each first terminal disc 414 can be characterized by a first terminal disc inner radius 462 and a first terminal disc outer radius 464, while each second terminal disc 424 can be characterized by a second terminal disc inner radius 466 and a second terminal disc outer radius 468. As shown in FIG. 7, each of the first terminal disc inner radius 462, the first terminal disc outer radius 464, the second terminal disc inner radius 466, and the second terminal disc outer radius 468 may be measured along a direction perpendicular to the central axis 402.

EPM Fabrication

With reference to FIG. 6, each EPM 440 includes a permanent magnet 448 in the form of a NdFeB grade 42 hard permanent magnet (12.7 mm length and 6.35 mm diameter), an electromagnet 442 with a magnetic core in the form of an AlNiCo grade 5 magnet of the same dimensions as the permanent magnet 448, two soft magnetic plates 450 in the form of thin steel rectangular plates (1008 cold rolled steel, 1.07 mm thickness) cut into a rectangular shape with the corners removed to accommodate closer positioning (see FIG. 5), and a winding 446 in the form of a copper magnet wire (AWG 28, 0.32 mm diameter) coil around the magnetic core (120 windings each, evenly spaced along the length of the coil, approximately 3.3 m in length). In this example, each EPM 440 is positioned and glued in place with cyanoacrylate glue to the soft magnetic plates 450 (see FIG. 9).

After fabricating all six EPMs 440, each EPM 440 was tested for its polarizing and depolarizing ability, using a teslameter with resolution up to 10 microtestla (μT) (TES11A model, Qingdao Tlead International Co., Qingdao China) to validate the amount of flux with high precision. The initially observed magnetic flux values for each EPM 440 were between 45 and 55 millitesla (mT) in magnetic flux density in the centerline between the soft magnetic plates 450 when in the on state and approximately 0-5 mT when in the off state.

For testing, each EPM 440 was transitioned between the on state and the off state by applying a switching current pulse first in the positive direction to polarize the EPM 440 to the on state, and later in the opposite direction to depolarize it to the off state. The EPMs 440 were then wired into three motor controllers with high current ratings and H-bridge functionality (15A Dual Motor Drive Module, NYBG Electronics, Wuhan, China), each with the capacity to supply current in either direction with the control signal provided by an Arduino Mega running a custom program.

To characterize each EPM 440, each EPM 440 was polarized with increasing lengths of polarization time (on the order of 0-3,000 μs). While this more precise characterization revealed differences between each EPM regarding the maximum amount of magnetic flux produced at the center point between each of the soft magnetic plates 450, the general variation between such maximum flux values was within a standard deviation and therefore acceptable for the prototype design. The MRF 404 will be flowing between the soft magnetic plates 450, so this first pass was sufficient for estimating the general capabilities of the EPMs 440. These variations may be attributable to the irregularities introduced from hand-assembling each EPM 440, cutting the steel sheets and magnets to size, and hand-winding the coils. Furthermore, misalignments of the teslameter probe used when measuring the generated B field could account for discrepancies. The results of this characterization are discussed in more detail below with reference to FIG. 18.

EPM Modeling with Simulation Software

The EPM arrays were modeled in Ansys Maxwell Magnetostatic Simulation software to predict the magnetic field formation characteristics. The cylinder representing the AlNiCo five magnet (i.e., the magnetic core) was given properties corresponding to a magnetization in the positive or negative z-direction for a given simulation and at values appropriate for that grade of magnet (magnitude of magnetization provided by the existing material libraries in Ansys). The N42 magnet (i.e., the permanent magnet 448) was given a constant magnetization of a set value using the built-in magnetic properties library for Maxwell.

Figure 10A:
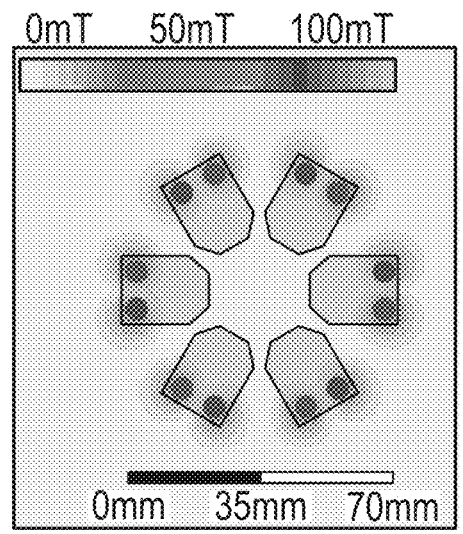
FIGS. 10A-10C are top views depicting simulations of magnetic fields produced by an electropermanent magnet array with (A) all electropermanent magnets in an off state, (B) three electropermanent magnets in the off state and three electropermanent magnets in an on state, and (C) all electropermanent magnets in the on state, according to an example.
Figure 10B:
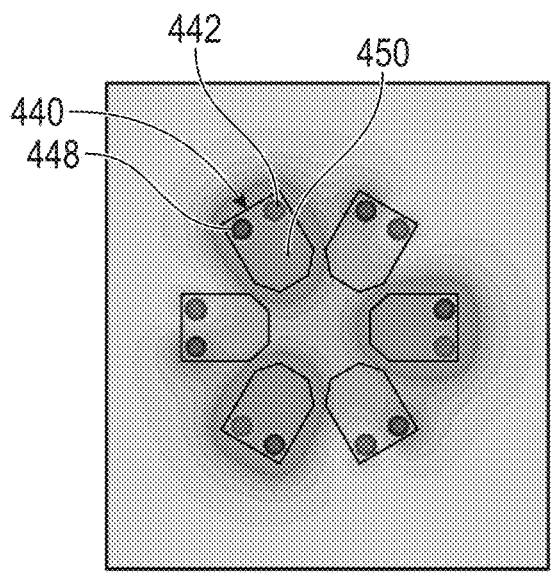
Figure 10C:
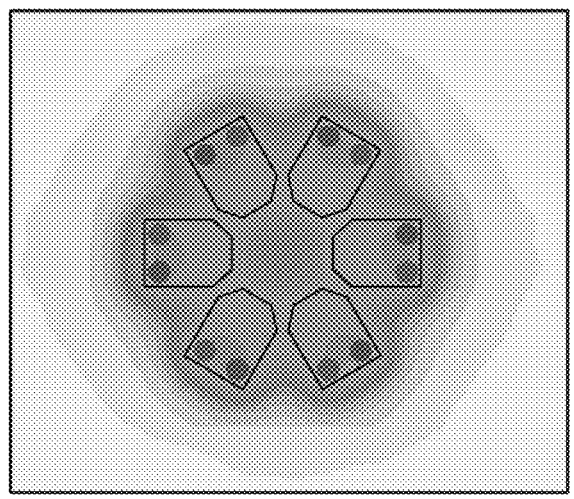

The results of this simulation are shown in FIGS. 10A-10C, which are top views depicting the magnetic fields generated by the array of EPMs 440 at a midpoint between the soft magnetic plates 450 of the EPMs 440 (e.g., corresponding to a region in which the MRF 404 is located). In particular, FIG. 10A represents the modeled magnetic fields generated when all EPMs are in the off state, while FIG. 10B represents the modeled magnetic fields generated when three of the EPMs are in the off state and the remaining three EPMs are in the off state. FIG. 10C represents the modeled magnetic fields generated when all EPMs are in the on state.

The results of FIGS. 10A-10C demonstrate that each EPM can be expected to generate up to ≈55 mT in ideal conditions when in the on state. These results also demonstrate that the EPMs produce≈0 mT between the soft magnetic plates 450 when they are in the off state. These validation steps show good agreement between the observed behavior for a single EPM (with a maximum observed polarization of 49.264±2.01 mT) and the theoretical ideal behavior (55 mT). These simulation results provide a baseline for further modeling and construction of the MRF clutch, as described below.

Analytical EPM Modeling

To predict the torque transmission behavior of the clutch design, the MR effect was modeled in MATLAB (Mathworks, Natick, MA, United States) for various physical parameters of the MEC. Unlike with electric fields, magnetic fields are generally non-linear (in spatial configuration) unless shaped by magnetic circuits. The EPMs of the present disclosure, along with the steel fins of the MEC (e.g., the first terminal discs 414 and the second terminal discs 424 shown in FIG. 7), present a region of high permeability for the magnetic flux; accordingly, the magnetic field within the MEC was approximated as a constant scalar value for modeling simplicity. The majority of the volume of the MRF is located between the parallel soft magnetic plates of each EPM and the internal fins of the MEC (i.e., the first terminal discs 414 and the second terminal discs 424), where the magnetic field is primarily linear in spatial configuration (i.e., directed between the plates of the EPM).

For this modeling, the Bingham model (see Bingham, E. C. (1922). Fluidity and plasticity. New York, United States: McGraw-Hill.) for a viscoplastic fluid with a finite yield stress was used to represent the MRF's yield behavior, together with characterization data from the manufacturer of the MRF fluid (LORD Corp, Cary, NC, United States). The first step towards modeling the torque is to approximate the magnetic field intensity within the active region of the MRF clutch design, denoted by a single value for H (with units of kA/m). While the field does vary within the total active region, it does so only a few mT between the plates as shown in FIG. 10C. This initial approximation is accomplished from the Ansys Maxwell simulations of EPM characterizations to estimate a typical magnetic flux density value provided by the EPMs, in this case, ≈50 mT. From the relationship between magnetic flux density (B) and magnetic field strength (H) in the B-H magnetization curves from the MRF materials datasheet, a H-value was estimated to be ≈5 kA/m. This approximation is for the magnetic field strength inside an EPM filled with MRF.

Having established a given static H value, the effect of the magnetized MRF on the rotating steel fins of the MEC may be approximated. The torque transferred from the input shaft of the motor (e.g., the first terminal shaft 416) is the summation of shear stresses developed between multiple stacked discs, such as the first terminal discs 414 and the second terminal discs 424 shown in FIG. 7. The analysis focuses on an active region corresponding to the torque transfer region 408 within which the first terminal discs 414 and second terminal discs 424 overlap, since the other regions occupied by the MRF are much smaller and at the edges of the active region, experiencing less magnetic flux density. The Bingham model for a viscoplastic fluid with a finite yield stress is shown in Equation 1, where $\dot{\gamma}$ is the shear rate (sec$^{-1}$), $\tau_y$ is the yield stress (Pa), and $\mu_p$ (Pa·s) is the plastic viscosity. From the datasheet for the MRF, $\mu_p$ is estimated to be 0.28.

$$\dot{\gamma} = 0, \tau < \tau_y, \quad (1)$$

-continued
$$\tau = \tau_y + \mu_p \dot{\gamma}, \tau > \tau_y.$$

The calculation for $\tau_y$ is fit to the characterization data for the MRF from LORD Corp. as a third order polynomial:

$$\tau_y\{H\} = -0.0000011503 H^3 - 0.00098714 H^2 + 0.52701 H + 1.43 \quad (2)$$

From the earlier choice of 5 kA/m for H, this approximates the $\tau_y$ to be 20.9 kPa. The gap between the parallel steel fins is small (0.5 mm), so the flow can be approximated as a Couette flow during operation at a given rotational velocity $\dot{\theta}$. The significance of the Couette flow solution is that the viscous stress tensor is constant everywhere in the flow field (see Davidson, J. R., and Krebs, H. I. (2018). An electrorheological fluid actuator for rehabilitation robotics. *Ieee. ASME. Trans. Mechatron.* 23, 2156-2167. doi: 10.1109/tmech.2018.2869126; Bingham, E. C. (1922). *Fluidity and plasticity*. New York, United States: McGraw-Hill). The shear rate along the surface of one of the fins of the MEC is a function of the radius along the width of the fin, its rotational velocity, and the gap between fins (e.g., the disc gap 460 shown in FIG. 7):

$$\dot{\gamma} = \frac{r\dot{\theta}}{g} \quad (3)$$

The differential torque dT generated by an area element dA is:

$$dT = r(\tau\{H\}dA) = r(\tau\{H\}2\pi r dr) \quad (4)$$

Inserting the Bingham model from Equations 1-3 (which assumes operation in the post-yield region) for shear stress yields the following equation for the differential torque:

$$dT = 2\pi \left(\tau_y\{H\} + \mu_p\left(\frac{r\dot{\theta}}{g}\right)\right) r^2 dr \quad (5)$$

The total torque from the surface of one fin is found by integrating the differential torque over the boundaries of the fin:

$$T_{fin} = 2\pi \tau_y\{H\} \int_{r_i}^{r_0} r^2 dr + \frac{2\pi \mu_p \dot{\theta}}{g} \int_{r_i}^{r_0} r^3 dr \quad (6)$$

In some examples, these boundaries of the fin can correspond to the outer and inner radius of the fin, such as the first terminal disc outer radius 464 and the first terminal disc inner radius 462 of each first terminal disc 414, or the second terminal disc outer radius 468 and the second terminal disc inner radius 466 of each second terminal disc 424. In other examples, these boundaries can correspond to radii corresponding to a region in which each first terminal disc 414 overlaps a corresponding second terminal disc 424, such as a region between the first terminal disc outer radius 464 and the second terminal disc inner radius 466.

Performing integration yields the following equation for the torque transferred to the surface of a single fin:

$$T_{fin} = \frac{2\pi}{3}\tau_y\{H\}(r_0^3 - r_i^3) + \frac{\pi\mu_p\dot{\theta}}{2g}(r_0^4 - r_i^4) \quad (7)$$

Since each fin attached to the central shaft (i.e., the first terminal hub 412) has two surfaces, and there are a total of four such fins in the clutch assembly 400, the net torque transferred to the MEC is calculated as the sum of each of the individual fin surfaces' torques:

$$T_{total} = 2(4(T_{fin})) \quad (8)$$

Figure 11A:
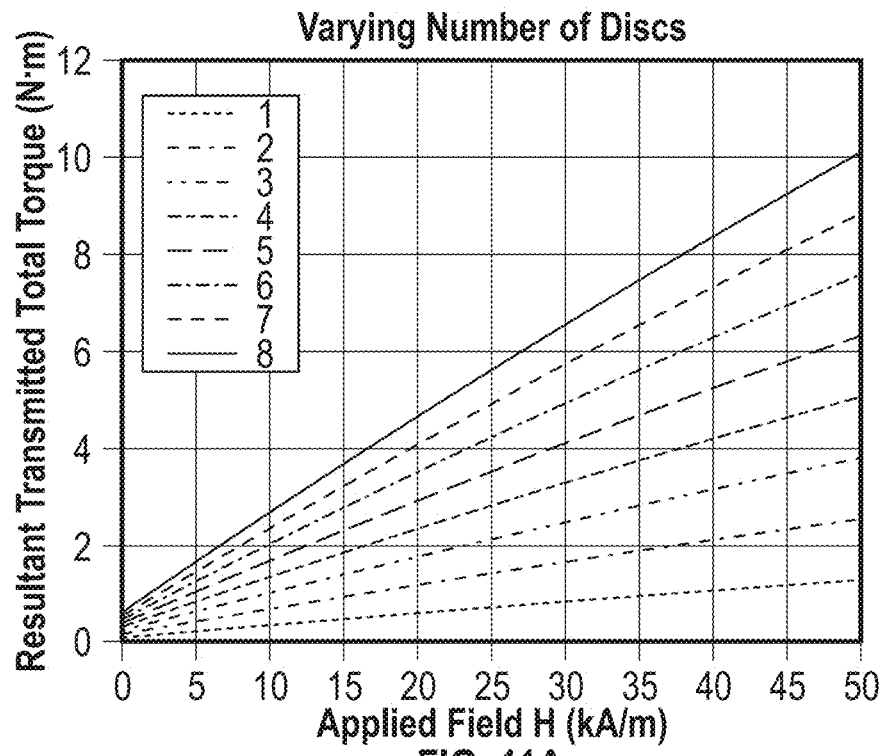
FIGS. 11A-11C illustrate the simulated effects on torque transmission through a clutch assembly of varying physical parameters of the clutch assembly according to an example.
Figure 11B:
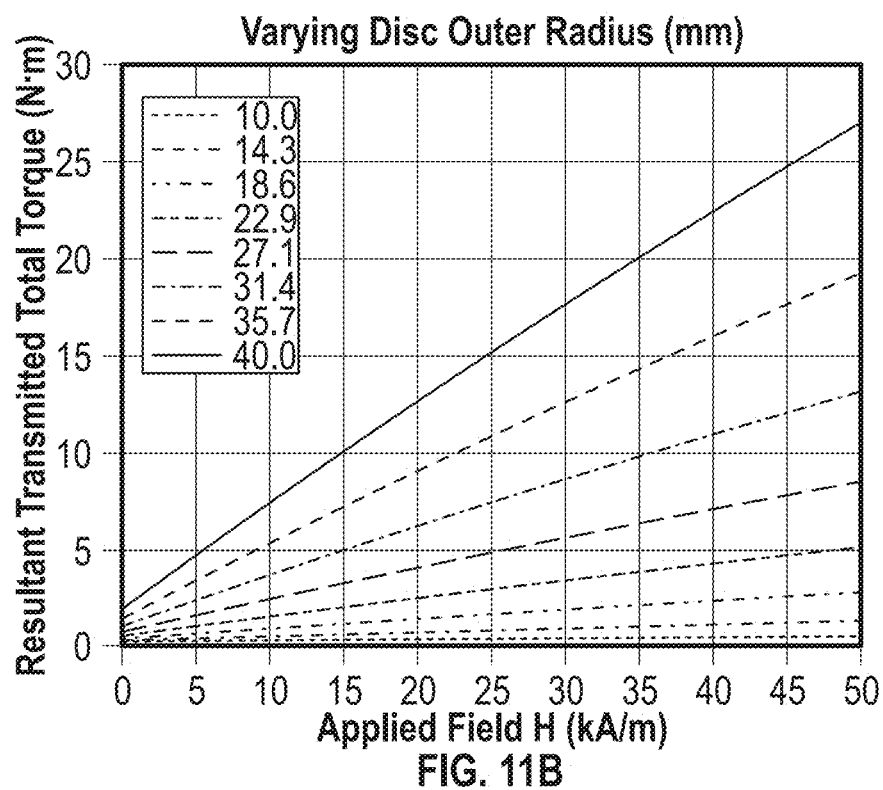
Figure 11C:
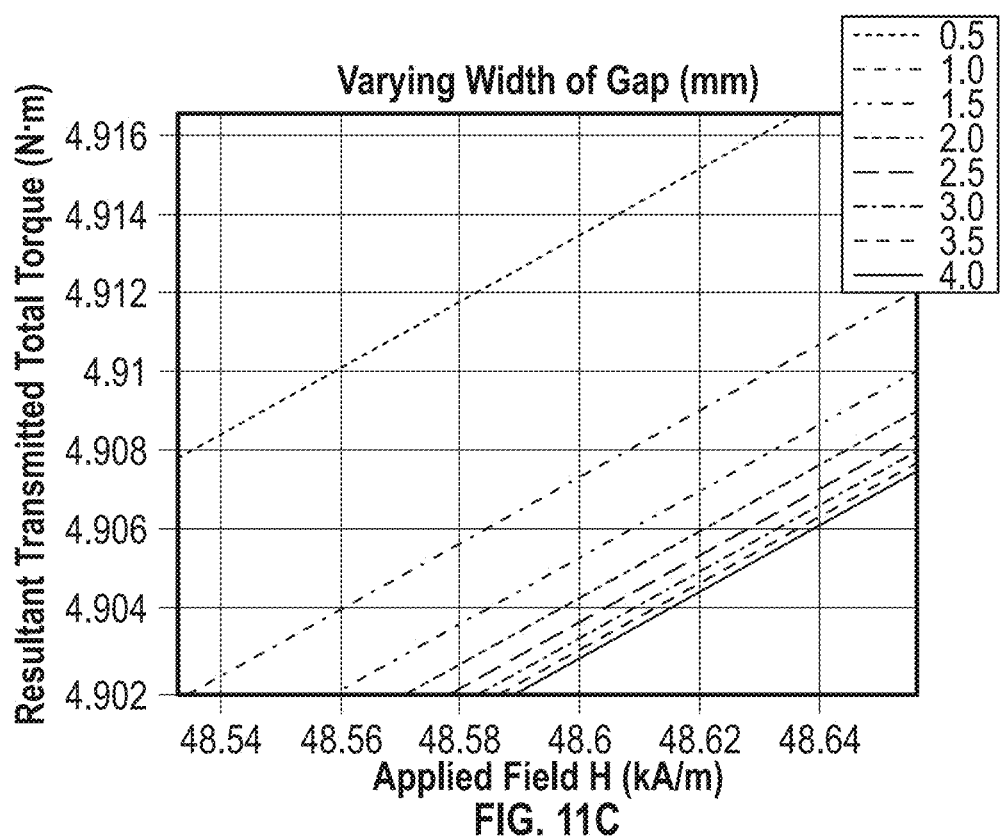

By varying the applied field H to approximate the Ty using Equation 2, the anticipated total torque from Equation 8 may be plotted as the result of various modifications to the geometric constraints of the MEC. The resultant effects on torque transmission are calculated using Equation 8 and are depicted in FIGS. 11A-11C. In these plots, it can be seen that that making the fins wider (FIG. 11B) and increasing the number of stacked discs (FIG. 11A) each yield a strong impact on the resultant torque transmitted. Increasing the disc gap size between fins decreases the transmitted torque (FIG. 11C), but the effect of gap size is much smaller than the effects from disc radius or number of discs (0.12% decrease at 48 kA/m from 0.5 mm to 1.0 mm gap size). In reality, altering the gap spacing would likely impact the assumed homogeneity of the applied magnetic field, and would contribute larger changes for different gap sizes. Unsurprisingly, this modeling demonstrates that, in general, larger disc surface areas correspond to greater torque transmission.

In the example of the clutch assembly 400, the dimensions of the first terminal discs 414 (as shown, e.g., in FIG. 7) are based upon these modeling considerations in mind and/or design choices based on the physical constraints of the EPMs and the thickness of the steel stock material (0.9 mm thickness). In particular, in this example, each first terminal disc 414 has a first terminal disc inner radius 462 of 15.5 mm and a first terminal disc outer radius 464 outer radius of 25 mm, and each first terminal disc 414 is spaced apart from the adjacent second terminal disc(s) 424 by a disc gap 460 of 0.5 mm. Other the physical dimensions are described in Table 1 below, in which the alphabetic labels correspond to the labels shown in FIG. 14:

TABLE 1

| Label | Component | Dimensions (diameter = D, inner diameter = $D_i$, outer diameter = $D_o$, length = L) |
| --- | --- | --- |
| A | Aluminum Shaft | 6.325 mm D, 150 mm L |
| B | Steel Fin Outer Rings (3x) | 31 mm $D_i$, 50 mm $D_o$ |
| C | Steel Fin Inner Rings (4x) | 29 mm $D_i$, 48 mm $D_o$ |
| D | Plastic Cap for sealing | 10.25 × 6.67 mm |
| E | Shaft Seals (2x) | 6.35 mm $D_i$, 19.05 mm $D_o$ |
| F | PLA Volume Filler Rings (2x) | 13.46 mm $D_i$, 22.0 mm $D_o$ |
| G | Bearings (2x) | 6.35 mm $D_i$, 12.7 mm $D_o$ |
| H | MEC Top | 57 mm D |
| I | MEC Bottom | 57 mm D |
| J | PTFE Washers | 6.35 mm $D_i$, 12.7 mm $D_o$ |

MEC Modeling with Simulation Software

Returning to magnetostatic simulations, a 3D model was created that best represents a balance between the takeaways from the previous section concerning gap and fin size. While more surface area is important for increasing transmitted torque, it also creates regions that are farther from the central active zone between the two plates of an EPM. Considering the physical constraints of the array of EPMs along with the design goal of increasing surface area, dimensions may be chosen for the steel fins that would ideally attract the magnetic flux and present a balance between more surface area and higher magnetic field intensity between the fins.

Figure 12:
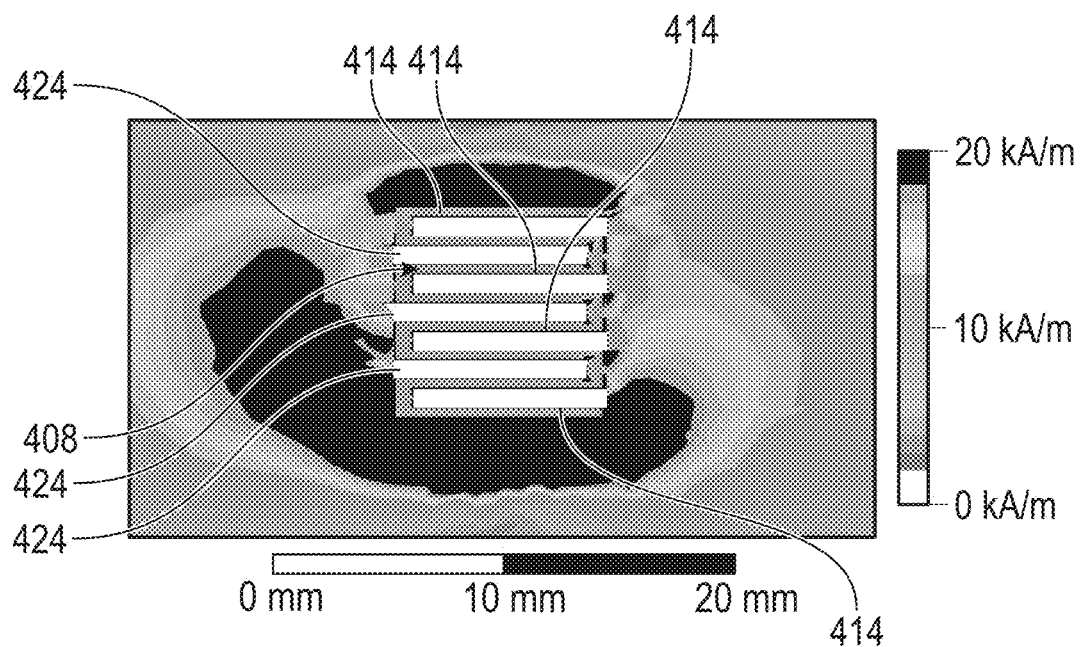
FIG. 12 is a cross-sectional side view depicting simulations of magnetic fields within a region of a clutch assembly according to an example.

Using parameters corresponding to simulation of an array of EPMs alone (as discussed above with reference to FIGS. 10A-10C), the magnetic fields for the clutch assembly design were simulated Ansys Maxwell. B-H curve characterization data for the MRF from the provided manufacturer materials datasheet were created using curve fitting, and these data were input into the simulation to model the effect of MRF in the spaces between the fins, the results of which are shown in FIG. 12. As may be seen in FIG. 12, the resulting MEC design is modeled to produce sufficiently high magnetic fields in the active regions (e.g., in the torque transfer regions 408 between the first terminal discs 414 and the second terminal discs 424) for the operation of the clutch assembly 400 (namely, around 150 mT within the MRF between the fins, or a value of about 8-10 kA/m). With this value of H field, and with reference to the modeling results shown in FIG. 13, the clutch assembly 400 is expected to be capable of transmitting over 1.1 N·m of torque in ideal conditions (see FIG. 13), with a minimum value of 0.3 N·m without any applied field. This nonzero minimum transmitted torque value at zero magnetic field may be understood as resulting from the baseline yield stress of the MRF.

Clutch Assembly Fabrication

Figure 14:
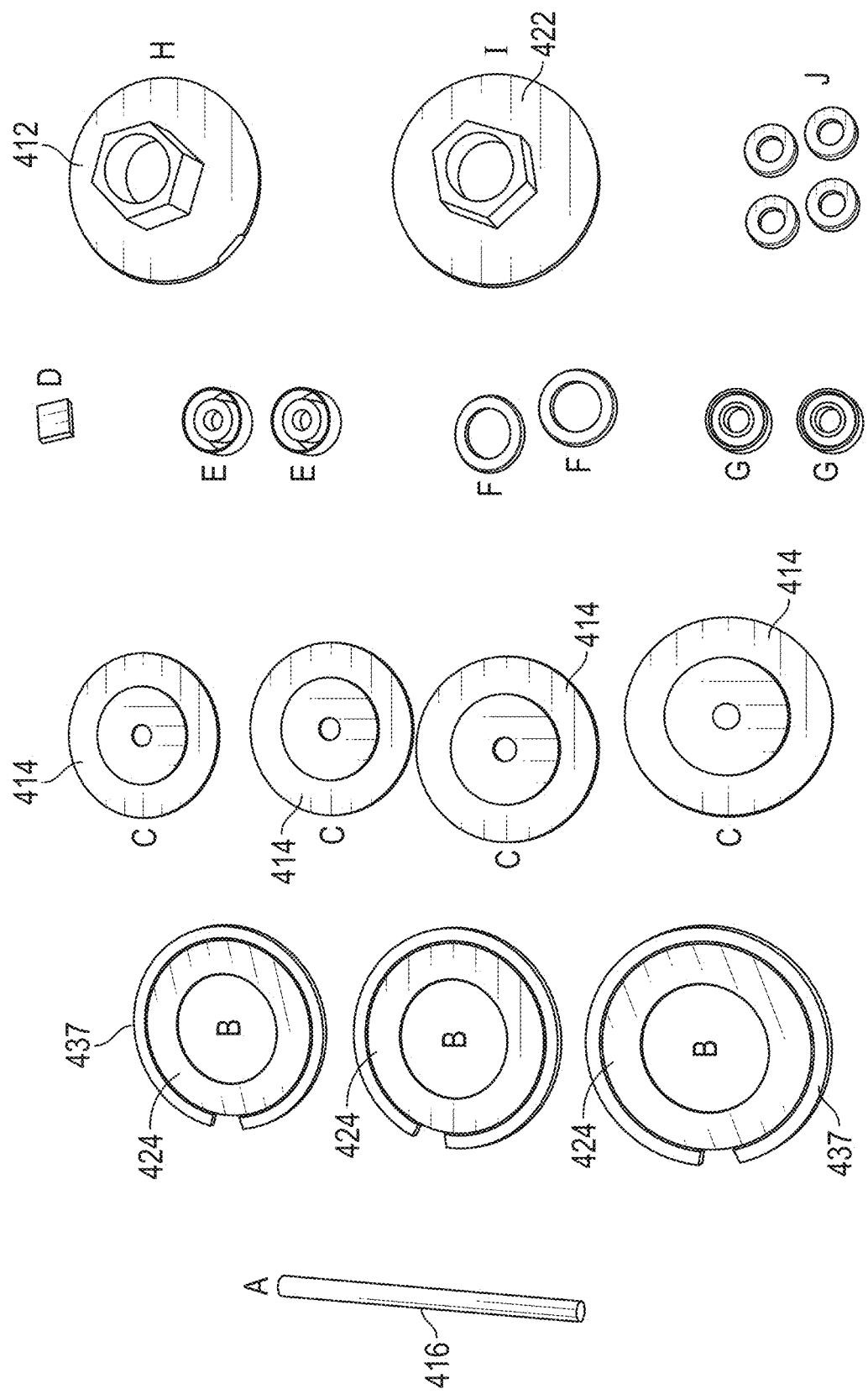
FIG. 14 is a top plan view illustrating various components of the clutch assembly of FIG. 5.

The clutch assembly 400 may be fabricated in any suitable manner. In particular, to fabricate the clutch assembly 400 disclosed herein, multiple subcomponents were 3D modeled using SolidWorks 2022 (Dassault Systems, Paris, France) and were 3D-printed (Prusa MK3S, Prusa Research, Prague, Czech Republic) at 0.1 mm vertical resolution and 20% infill with standard PLA filament. For the metal fins, each was cut into discs from sheet metal (1008 grade cold-rolled steel, 0.3 mm thickness) using a water-jet (Proto-MAX Water Jet, OMAX Corp, Kent, Washington, United States). A 6.35 mm diameter aluminum rod was cut to a length of 150 mm for the central shaft (e.g., the first terminal shaft 416). After all the individual pieces were fabricated, the layered fins including of metal rings and plastic hoops or discs were aligned and glued together using CA glue. All of the sub-elements of the MEC assembly are shown in FIG. 14 and described in Table 1. The design files are available on GitHub (see Bira, N. (2022). *Mec design files*. Philadelphia: IEEE Available at: https://github.com/BiraN2019/MEC).

After all sub-components were fabricated, the MEC was assembled layer by layer, from bottom to top. The shaft seals (labeled E in Table 1 and FIG. 14) were press-fit into position on either side of the top (labeled H in Table 1 and FIG. 14) and bottom (labeled I in Table 1 and FIG. 14) 3D printed components, followed by a ball bearing (labeled G in Table 1 and FIG. 14) for shaft alignment and rotation. The aluminum rod (labeled A in Table 1 and FIG. 14) was placed and aligned in the bottom component, and PTFE washers (labeled J in Table 1 and FIG. 14) and 3D-printed spacers (labeled F in Table 1 and FIG. 14) were placed on top of the shaft seal to ensure proper spacing of the fins. Then, successive layers of inner fins (labeled C in Table 1 and FIG. 14)

and outer fins (labeled B in Table 1 and FIG. 14) were positioned and glued to either the central rod or the outer housing. The top component was assembled the same way as the bottom, but in reverse order (PTFE washers, 3D-printed spacers, top sub-assembly with shaft seal and bearing). After all layers were positioned and glued, with time to allow the glue to dry, the assembled MEC was visually inspected and tested for free, low-friction rotation.

Figure 15:
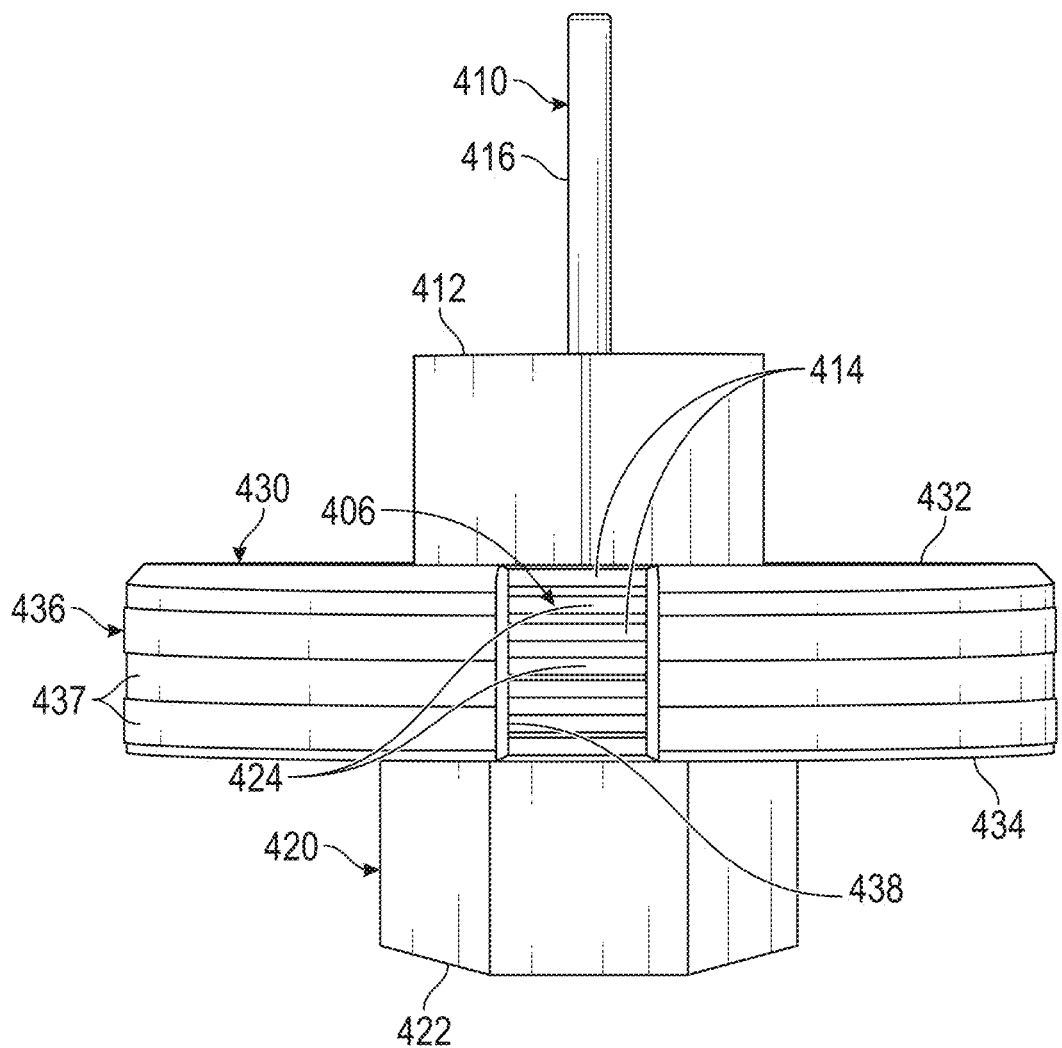
FIG. 15 is a side elevation view illustrating a portion of the clutch assembly of FIG. 5.

FIGS. 6 and 14-15 also illustrate a manner in which the side surface 436 of the clutch assembly 400 may be formed. In particular, in this example, the side surface 436 of the clutch body 430 includes a plurality of annular side surface segments 437 that are arranged in a stacked configuration and affixed to one another to collectively form the side surface 436. As shown in FIG. 14, each side surface segment 437 is fixedly coupled to a corresponding second terminal disc 424 such that assembling the side surface segments 437 operates to position the second terminal discs 424 within the clutch body 430.

In general, it is desirable that the MEC (e.g., the enclosed volume 306 of the clutch body 330) be filled with MRF (e.g., the torque transfer fluid 304) such that no void spaces remain within the MEC. In the example of the clutch assembly 400, the MEC was filled with the MRF using a non-magnetic metal syringe through an opening 438 (e.g., FIG. 15) in the outer housing that allows access to the enclosed volume 406 of the clutch body 430. As shown in FIGS. 14-15, each side surface segment 437 defines a portion of the opening 438. After all internal voids were filled with the MRF (MRF-140CG, Lord Corp), the first terminal shaft 416 was rotated to ensure no bubbles remained. Then, the opening 438 was capped and glued shut with a 3D-printed cap (labeled D in Table 1 and FIG. 14) and CA glue.

Having assembled all the internal elements of the MEC, six EPMs were then positioned radially around the perimeter of the completed sub-assembly of the MEC such that each EPM has its active region (e.g., the region between the soft magnetic plates 450) targeting about ⅙th of the overall volume of the MEC. As labeled in FIGS. 6 and 8, the 3D-printed top and bottom elements of the first terminal 410 and the second terminal 420 include alignment features 418 and alignment features 428, respectively, which may be used as positioning guides for even spacing of the EPMs 440. All these components were assembled by hand and aligned visually, but minor imperfections present in the tolerances of the 3D printed and hand-cut elements likely contribute to some of the variability and noise present in the recorded data discussed below.

Figure 16:
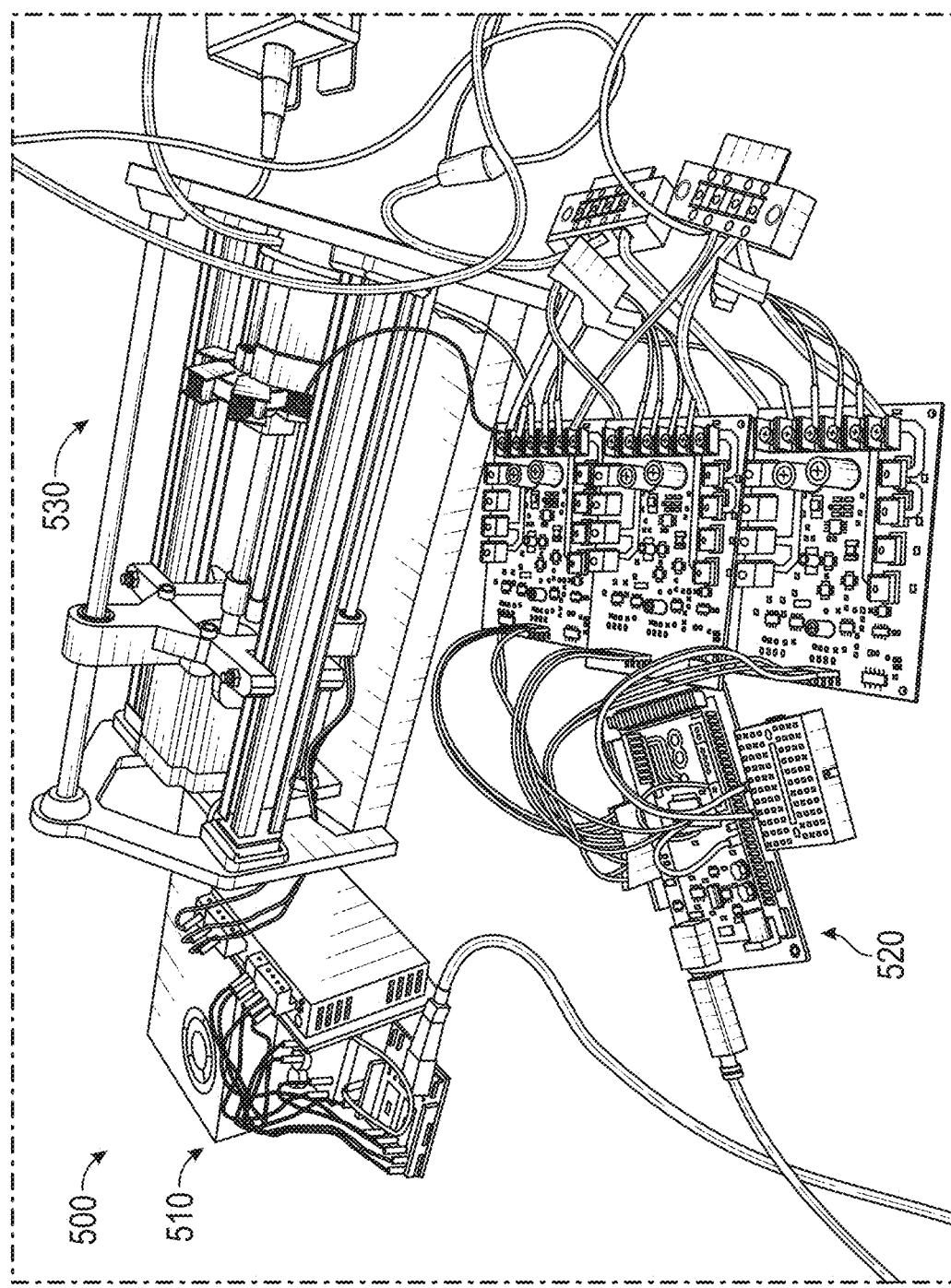
FIGS. 16-17 illustrate components of a test-bed for measuring the torque transmission through a magnetic clutch according to an example.
Figure 17:
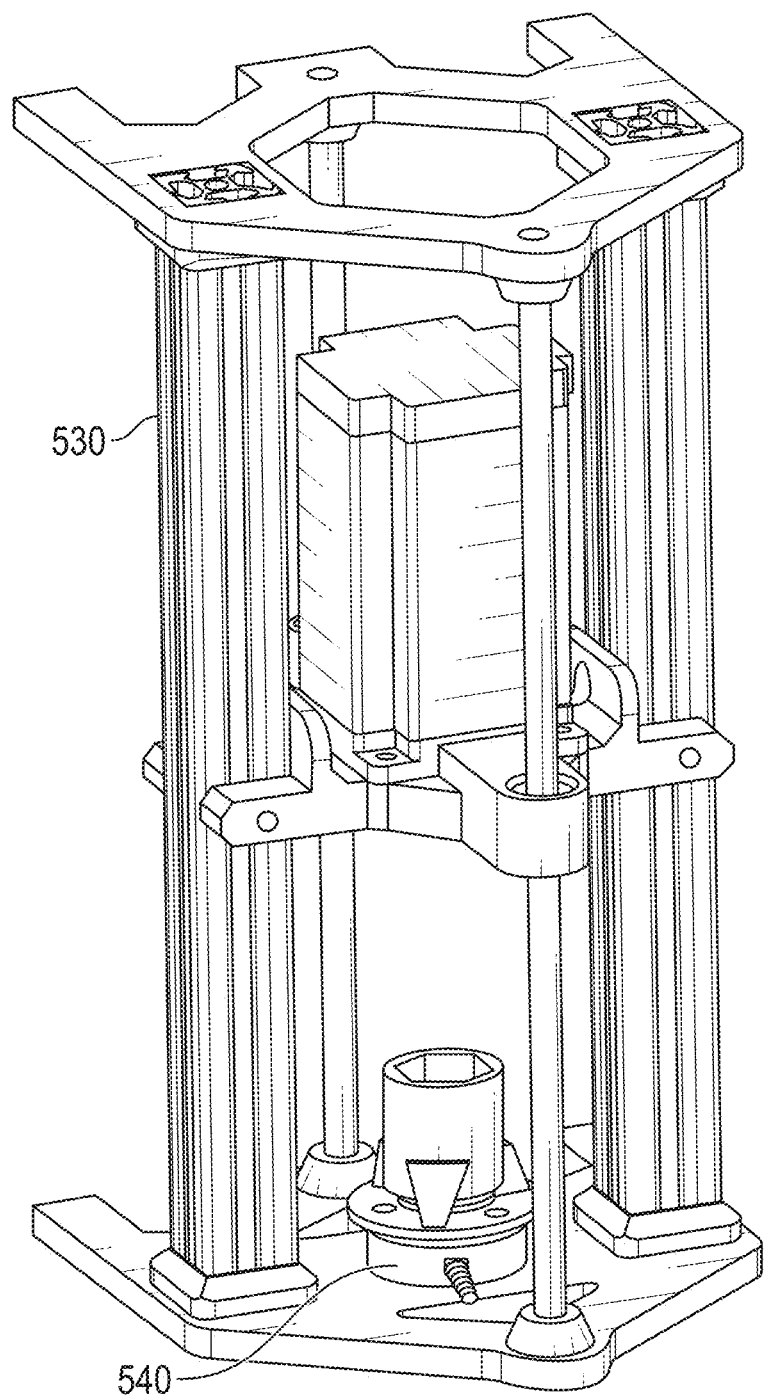

For testing and performance analysis, the assembled MEC was placed into a custom-designed testing apparatus to evaluate its performance, shown in FIGS. 16-17. With reference to FIGS. 16-17, the testing apparatus 500 utilizes a stepper motor 510 (FIG. 16) spinning at a constant RPM controlled by a power supply, an Arduino Uno, and a stepper driver. The output shaft of the stepper motor is coupled to the input shaft of the MEC with a shaft collar and set screw, and the outer housing of the MEC is fixed at the bottom to a 6-axis force/torque sensor (540, FIG. 17) (Mini40 Six-Axis Force/Torque Sensor, ATI, Apex, NC, United States) rigidly attached between the base of the test-bed and the clutch. This sensor collected force and torque data at a sampling rate of 10,000 Hz to observe changes on the same timescale of the EPM pulse lengths under consideration (100s of μs). As shown in FIG. 16, an Arduino Mega (labeled 520) controls three H-bridge motor drivers connected to a bench-top power supply for current supply to the clutch assembly. As shown in FIG. 17, a mounting frame 530 allows the stepper motor to slide linearly in place and to be coupled to the first terminal shaft 416 with a set screw collar. The force/torque sensor 540 includes a collar for holding the bottom of the clutch assembly 400.

EXPERIMENTAL RESULTS

In this section, characterizations performed for both the EPM array (discussed below with reference to FIG. 18) as well as the completed prototype MEC are described. Additionally discussed are the torque transmission capabilities of the MEC and development of a control strategy from curve-fitting functions to observed data at different EPM pulse lengths. The resulting set-point control method is discussed with reference to FIG. 25, followed by an examination of the MEC response to variable pulse lengths applied rapidly, as well as different rotational velocities.

To characterize the clutch assembly 400, the stepper motor was driven at 50 RPM, which represents a medium speed for the stepper motor. A number of tests were performed to highlight the overall performance of the MEC, as well as possibilities from different low-power control strategies.

Figure 19A:
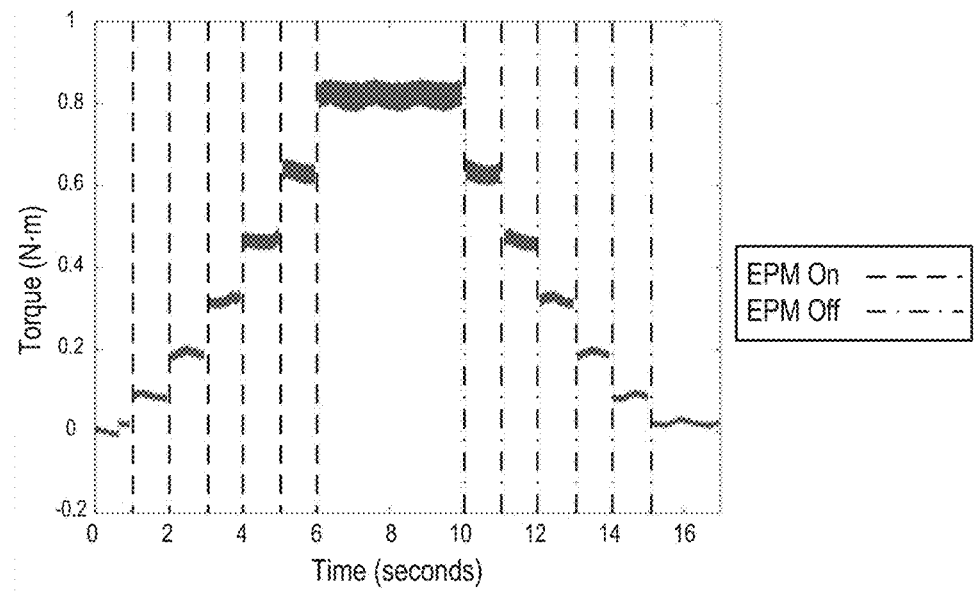
FIG. 19A illustrates the measured torque transmission through a clutch assembly as electropermanent magnets of the clutch assembly are sequentially activated individually according to an example.
Figure 19B:
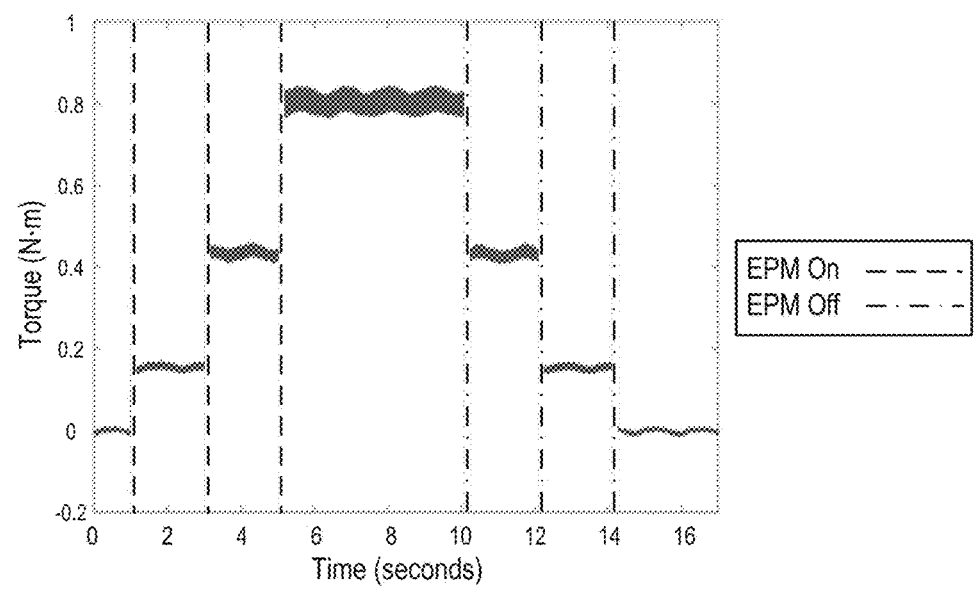
FIG. 19B illustrates the measured torque transmission through a clutch assembly as electropermanent magnets of the clutch assembly are sequentially activated pairwise according to an example.
Figure 20:
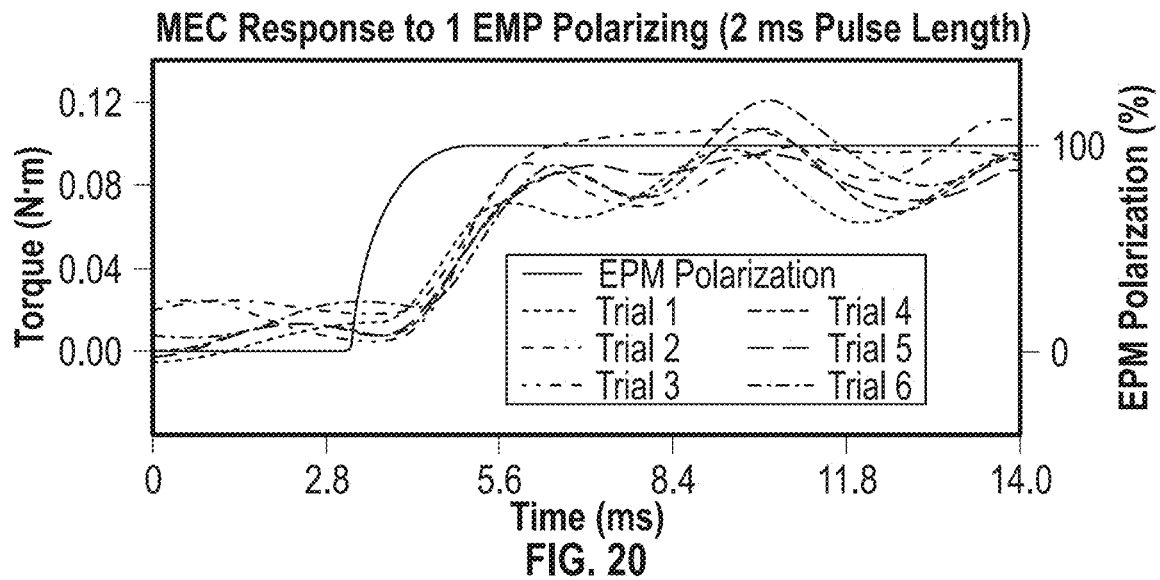
FIG. 20 illustrates the measured torque transmission through a clutch assembly as a function of time relative to the time-dependent polarization of an electropermanent magnet according to an example.

First, two tests were completed that examined the immediate response of the MEC to an input sequence where multiple EPMs are activated in sequence. Sequentially activating the EPMs one at a time or two at a time resulted in rapid changes in transmitted torque from the input shaft and was repeatable in both the rising and falling directions. These control patterns are shown in FIGS. 19A-19B, where each plot represents the average of three separate data series following the same control input. All torque values were normalized to the baseline torque of the MEC with all EPMs in the inactive state (0.10 N·m without MRF added, from friction, and 0.16 N·m with MRF). A typical rise time from EPM activation until the MEC has reached its next target transmitted torque is 3.97 ms for the single-step modality (see FIG. 19A), in which the EPMs were sequentially activated individually. This value represents the average of nine separate activation trials, with a standard deviation of 1.98 ms. In trials in which the EPMs were sequentially activated in pairs (FIG. 19B), the rise time was 23.14 ms on average, with a standard deviation of 0.98 ms. These values coincide with the length of polarization for each individual EPM (e.g., the duration of each switching current pulse), which was set to 5.0 ms for these tests to ensure complete polarization and activation of each EPM. The two-step mode would take 11.0 ms to polarize two EPMs fully, with programmed delays in the automated testing script. The two-step mode took longer than the single-step mode for its rise time, but it was also rising a greater amount. As shown in FIG. 20, all trials were observed to begin changing in response to the EPM polarizing on the order of a couple ms, which agrees with many other MRF-based clutches (often with response times on the order of <10 ms; see Phu, D. X., and Choi, S.-B. (2019). Magnetorheological fluid based devices reported in 2013-2018: Mini-review and comment on structural configurations. *Front. Mat.* 6, 19. doi: 10.3389/fmats.2019.00019). These results demonstrate the rapid, repeatable, and reversible nature of the MEC design.

Next, the dependence of the overall transmitted torque in the MEC upon the length of polarization is investigated. Data were recorded for both polarization and depolarization of the MEC at different switching current pulse lengths. For polarization, the switching current pulse length was applied after all EPMs were depolarized completely with a pulse length of 5 ms. For depolarization, all EPMs were fully polarized with a switching current pulse length of 5 ms before applying the depolarizing switching current pulse. The transmitted torque was measured nine times, and the average changes in transmitted torque as a function of pulse length are shown in FIG. 21.

Figure 21:
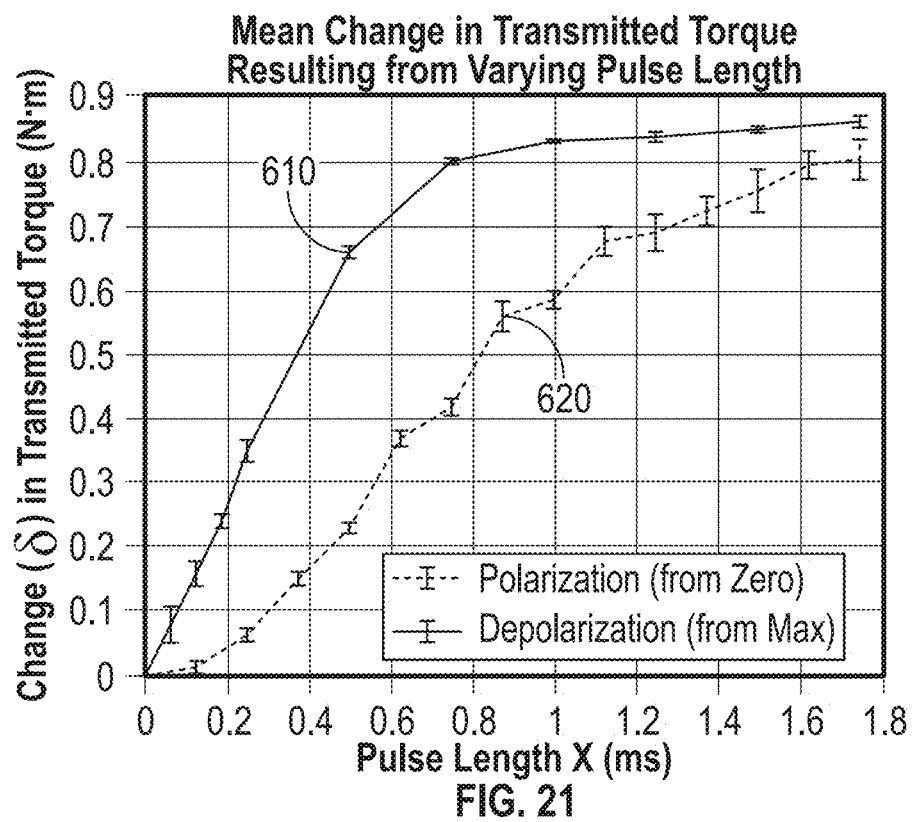
FIG. 21 illustrates the average measured change in the torque transmitted through a clutch assembly as a function of a switching current pulse length while polarizing and depolarizing the electromagnet of an electropermanent magnet according to an example.

In FIG. 21, the vertical axis represents the change in the transmitted torque that was produced for a given switching current pulse length (represented on the horizontal axis). For example, to test the dependence of switching current pulse length on depolarization (corresponding to the data labeled 610 in FIG. 21), each EPM was initialized to the fully polarized state, and each data point in FIG. 21 represents the average decrease in the transmitted torque when each EPM was depolarized with a switching current pulse of a given duration. Similarly, to test the dependence of switching current pulse length on polarization (corresponding to the data labeled 620 in FIG. 21), each EPM was initialized to the fully depolarized state, and each data point in FIG. 21 represents the average increase in the transmitted torque when each EPM was polarized with a switching current pulse of a given duration.

FIG. 21 demonstrates significant hysteresis between polarization and depolarization for the length of pulse required to affect a change in the total torque transmission. Such observed hysteresis is consistent with the general principles of the magnetization behavior of a permanent magnet such as AlNiCo, as discussed below.

After collecting the data represented in FIG. 21, analytical functions were fit to the polarizing and depolarizing data, utilizing the MATLAB curve-fitting toolbox, resulting in functions in the form of respective inverse-tangent equations. These functions can then be used to choose an arbitrary set point within the range of possible torque values for the MEC. Stated differently, with such functions modeling the torque response to a polarizing or depolarizing switching current pulse length, such functions can be used to determine the switching current pulse length corresponding to an arbitrarily selected (e.g., desired) torque response. The inverse-tangent functional form was chosen as it provided the greatest fit for polarization while keeping calculations simple (adjusted $R^2$-value was 0.97). These equations calculate the length of a switching current pulse required to then magnetize or demagnetize all six EPMs from zero or saturation by the desired amount to reach the set point. Solving for the pulse length (x, in seconds) and calculating the change in target torque from the current torque (d), the two equations take the form of:

$$x_{polarize} = (\tan(\delta/0.9)/759.0), \quad (9)$$

$$x_{depolarize} = (\tan(-\delta/0.9)/1713.0)$$

Figure 22:
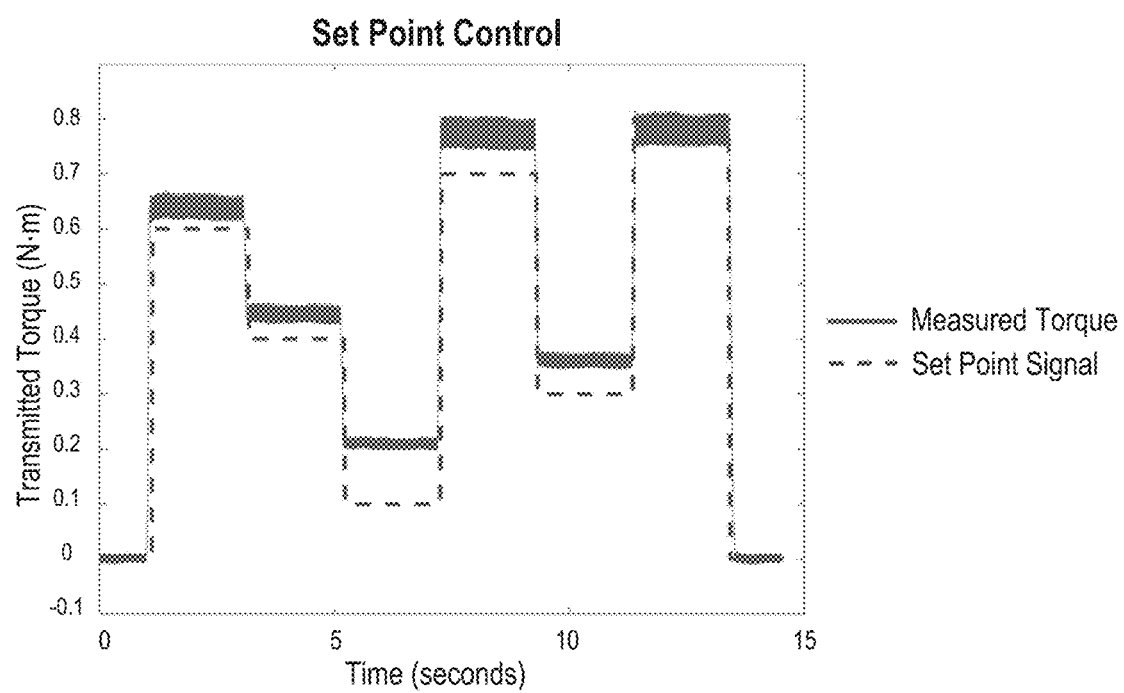
FIG. 22 illustrates the measured transmitted torque compared to a target torque set-point in an experimental trial according to an example.

To test this control strategy, a sequence of arbitrary targeted torque set points was selected, and the transmitted torque was adjusted to meet the sequence of set points by activating the EPMs for a set pulse length determined by the new set point, according to Equation 9. The results of this experiment are shown in FIG. 22. It can be seen that the initial increase in torque overshoots the intended target torque by≈0.03 Nm, and this initial error propagates throughout the remainder of the test. While the direction and magnitude of the corrections are close to the control signal, these errors compound over time, leading to overshooting or undershooting the targeted torque. These results are discussed in more detail below.

Figure 23:
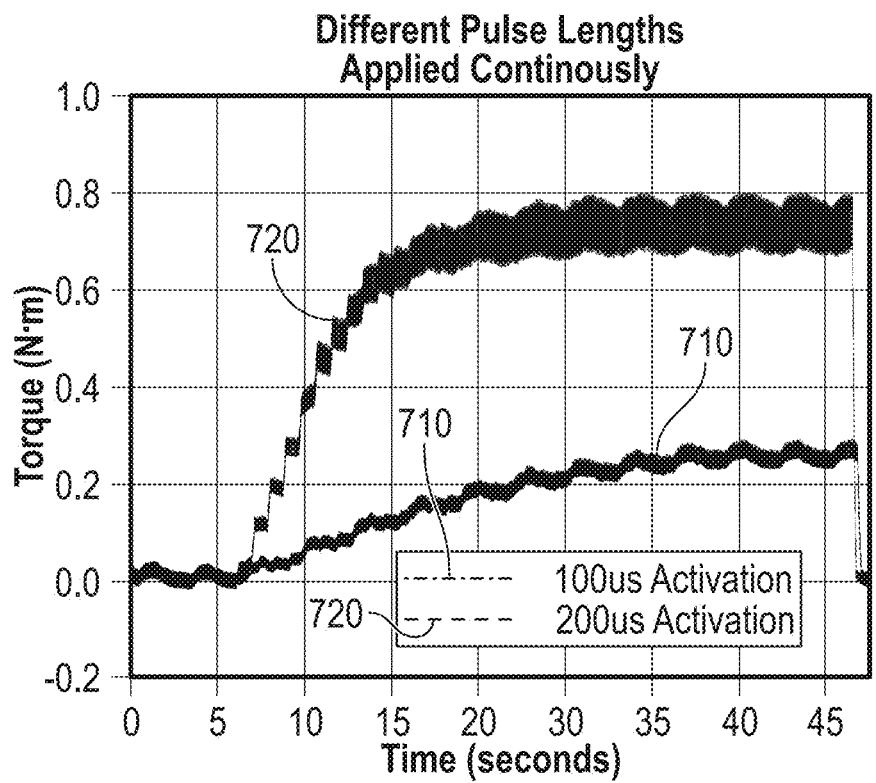
FIG. 23 illustrates the measured total torque transmission through a clutch assembly resulting from a sequential series of electropermanent magnet switching current pulses with different pulse lengths according to an example.

After observing the differences between the targeted torque and the actual behavior of the MEC while following the control signal, the effect of switching current pulse length on the torque transmission was investigated in more detail, focusing on small pulse lengths applied in rapid succession (30 times total) to slowly increase the overall magnetization of the EPMs. This was measured for two switching current pulse lengths (0.1 and 0.2 ms), each being applied to all six EPMs sequentially (taking about 30 ms total) with a short pause (300 ms) in between each application. The results are shown in FIG. 23, in which the data labeled 710 represent switching current pulse lengths of 0.1 ms and in which the data labeled 720 represent switching current pulse lengths of 0.2 ms. These results demonstrate that sequential switching current pulses with a pulse length of only 100 µs raised the transmitted torque to about 0.2 N·m before reaching a plateau, while doubling the pulse length of each switching current pulse to 0.2 ms was sufficient to raise the transmitted torque a maximum value of about 0.65 N·m. The significance of this behavior is discussed in more detail below.

Figure 24:
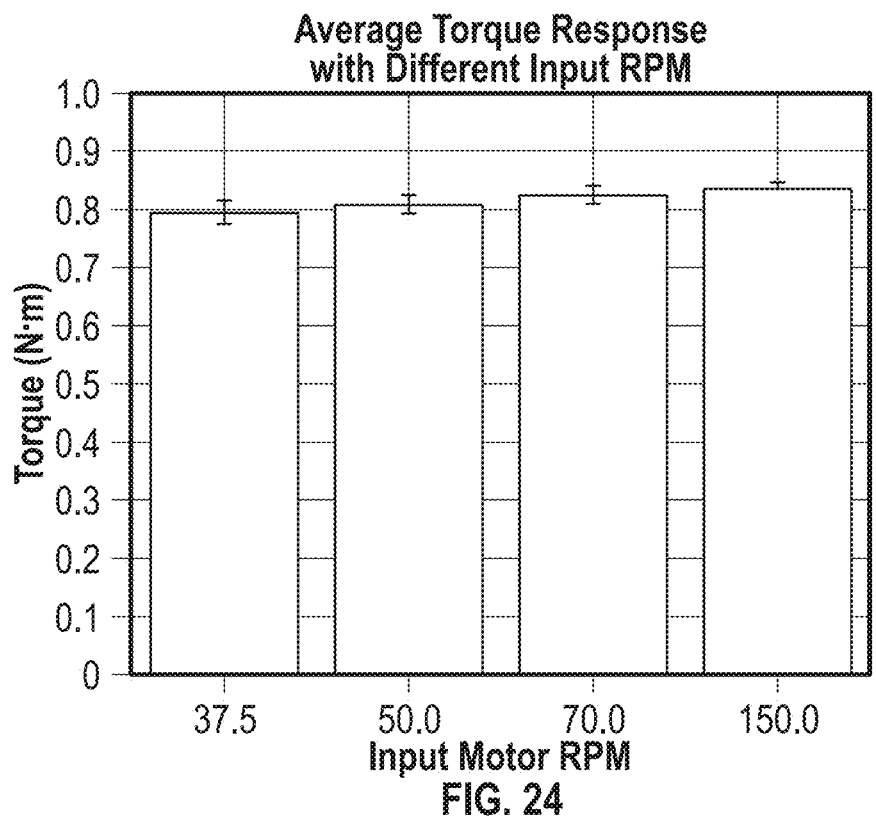
FIG. 24 illustrates the dependence of the maximum torque transmission through a clutch assembly on the rotational speed of an input motor according to an example.

Lastly, the input motor RPM was considered for its effect on the results of the tests. With reference to FIG. 24, a slight increase in total transmitted torque was observed as the input RPM was increased, but the effect was within standard deviation for each speed, and therefore deemed negligible. Stated differently, in the present disclosure, it is assumed that varying the rotational speed of the torque source that rotates the first terminal 410 does not significantly affect the torque transfer characteristics of the clutch assembly 400, which instead are predominantly determined by other variables such as those discussed herein.

Discussion

In this section, the results of the experiments discussed above are explored, and the design of the clutch assembly 400 is discussed in view of these results.

Various experiments were performed to demonstrate the torque-transmitting capabilities of the MEC and to characterize its behavior. While the MEC was highly repeatable for the individually addressed EPM tests shown in FIG. 20, a greater variability in the torque-transmitting capabilities was observed when attempting to utilize the magnetization properties of the AlNiCo (e.g., to only partially polarize or depolarize the EPM) in the EPM array to control a specific torque.

Figure 18:
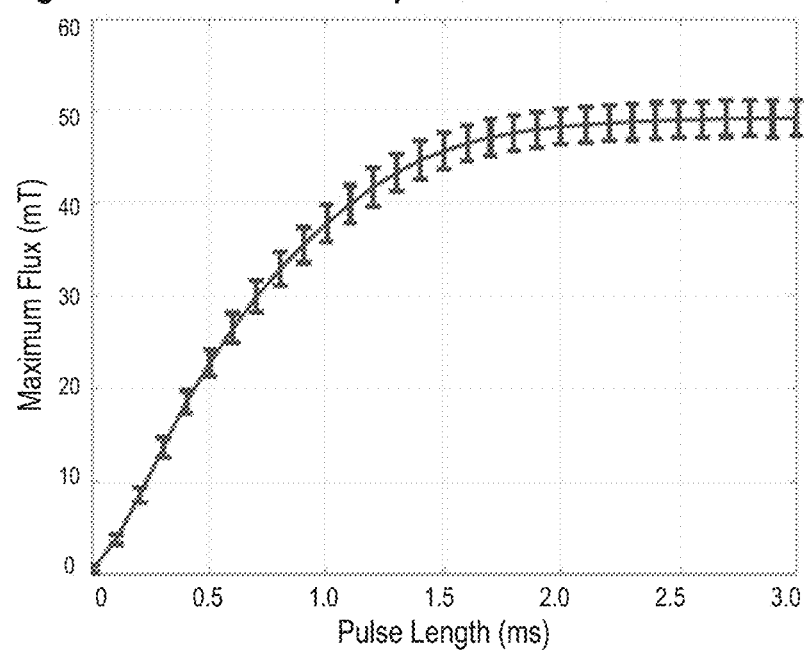
FIG. 18 illustrates the measured magnetic flux density generated by an electropermanent magnet as a function of a switching current pulse length applied to the electropermanent magnet according to an example.

The results of FIG. 18 demonstrate that the amount of magnetic flux produced by each EPM may be at least partially controlled via control of the duration of the switching current pulse length. In particular, FIG. 18 demonstrates that the magnetic flux generated by an EPM that is initialized to the fully depolarized state and that is partially polarized by a switching current pulse follows a well-defined and repeatable trend.

The functional equations developed to fit to the observational data shown in FIG. 21, however, were less accurate at producing an arbitrarily targeted torque value. This is likely the result of the hysteresis present during the magnetization of the AlNiCo core magnet, as shown in FIG. 21. In particular, when starting from zero (demagnetized) magnetization, greater switching current pulse durations are required to yield a change in the magnetization of the AlNiCo magnet that corresponds to a specified change in torque. Alternatively, when the AlNiCo magnet is fully magnetized (e.g., fully saturated), much shorter switching current pulse lengths rapidly cause a decrease in transmitted torque (or, more directly, a decrease in the magnetization of the AlNiCo magnet). This phenomenon is seen in other MRF-based clutch designs, in which adaptive control strategies are deployed to compensate (see Yadmellat, P., and Kermani, M. R. (2016). Adaptive control of a hysteretic magnetorheological robot actuator. Ieee. ASME. Trans. Mechatron. 21, 1336-1344. doi: 10.1109/tmech.2016.2524673).

The challenges in producing an arbitrarily targeted torque value also may result from the fact that different switching current pulse lengths likely are required to produce a given change in torque when the EPM begins in an intermediate state. For example, while FIG. 21 shows the changes in torque achieved when beginning in a fully polarized or fully unpolarized state, the hysteresis evident in FIG. 21 suggests that this relationship between pulse length and torque differential may not extend to examples in which the EPM begins in an intermediate state between the fully polarized and fully unpolarized states.

Accordingly, to account for such hysteresis effects, it may be beneficial to more fully characterize the relationship between transmitted torque differences and switching current pulse lengths at a variety of intermediate initial states of the EPM. For example, existing characterization curves for AlNiCo can be utilized to realize more sophisticated strategy that tracks the current magnetization of the EPM. Such magnetic hysteresis of AlNiCo may be seen in characterization B-H curves (see Yu, C., Niu, S., Ho, S. L., Fu, W., and Li, L. (2014). Imbalanced force in permanent magnet brushless motors with magnetic and/or electric asymmetrics. IEEE Trans. Magn. 51, 1-4. doi: 10.1109/tmag.2014.2329951). Additionally or alternatively, some sensing feedback of the current transmitted torque may be incorporated, allowing for control strategies such as PID to fine tune transmitted torque with small pulse lengths to adjust the current torque to the target torque on short time scales (e.g., tens of milliseconds).

With reference to FIG. 23, the use of a series of short switching current pulse lengths (e.g., 0.1-0.2 ms) can enable slowly building the transmitted torque incrementally, and with a fine degree of resolution. The granularity with which the transmitted torque may be varied, however, also may be limited by a minimum switching current pulse length that is sufficient to drive the EPM to full polarization. In particular, and as shown in FIG. 23, a switching current pulse length of 0.1 ms was observed to reach a polarization limit that is less than full polarization of the EPM, as such a pulse was unable to enact a magnetization of the AlNiCo beyond the plateau value. Longer switching current pulse lengths quickly overcome this shortcoming, with 0.2 ms pulse length reaching much closer to the overall intended maximum transmitted torque. While a switching current pulse length of 200 ms can offer a useful degree of granularity in controlling the transmitted torque, a more thorough characterization of the resistance to magnetization at short switching current pulse lengths and a variety of initial magnetizations may better inform a control strategy for slower torque transmission responses. For example, such small adjustments may also allow for more gradual set-point following, with smoother transitions similar to that of PID controllers.

Other control strategies can combine both the individual EPM control shown in FIGS. 19A-20 with the pulse-length control in shown in FIG. 21 to realize unique patterns of EPM activation in order to yield more complex torque transmission modalities, such as linearly or exponentially ramping the torque as opposed to jumping from one set point to another.

Selective activation of a subset of the EPMs of a clutch assembly and variation of the switching current pulse length supplied to each EPM allow for granular control of transmitted torque across a broad spectrum of possible torques. Additionally, the significant manufacturing differences between each EPM and the overall construction of the MEC may be regarded as introducing of much of the variability present in the characterization data. Improvements to manufacturing methodology, better precision machining, and better tolerances are expected to contribute greatly to minimizing variability between each EPM and the overall MEC behavior.

Figure 13:
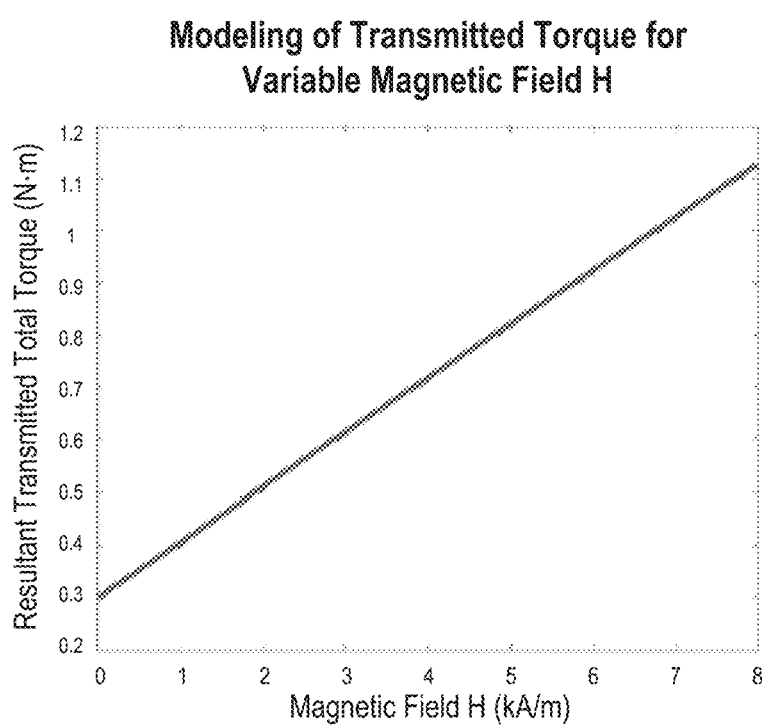
FIG. 13 illustrates the simulated torque transmission through a clutch assembly as a function of the magnetic field extending through the clutch assembly, according to an example.
Figure 25:
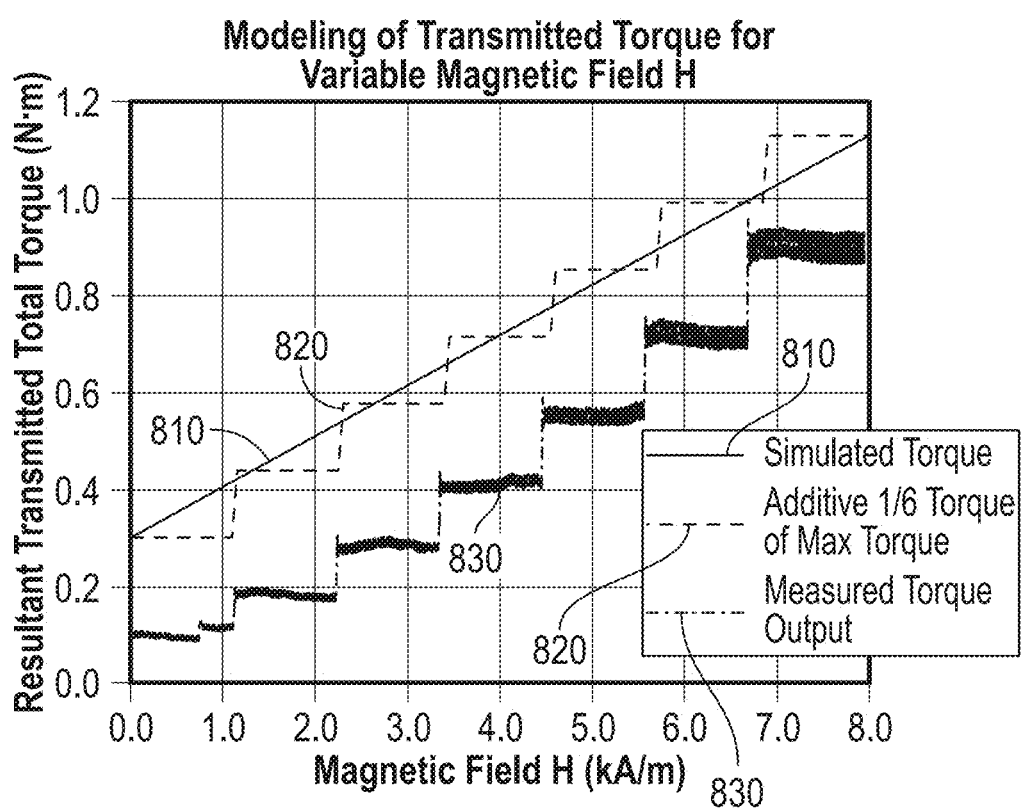
FIG. 25 illustrates simulated and measured torque transmission values through a clutch assembly as a function of magnetic field, according to an example.

As shown in FIG. 13, the modeling discussed above predicts a maximum possible transmitted torque of about 1.1 N·m. The experimental results shown in FIGS. 19A-19B, by contrast, exhibit a maximum holding torque of about 0.8 N·m, about 0.3 N·m less than the predicted value. In FIG. 25, the simulation data from FIG. 13 (labeled 810) are plotted along with a theoretical ideal-case behavior (labeled 820), in which each EPM contributes ⅙th of the total torque as it is added (e.g., activated) in sequence. When all six EPMs are activated, this torque value reaches the maximum torque. Also shown in FIG. 25 are the data representing the average behavior of the MEC with all six EPMs activating in sequence, corresponding to FIG. 19A and labeled 830 in FIG. 25. The measured data 830 look quite similar to the theoretical data 820, and these trends would be in excellent agreement with one another if the measured data 830 were uniformly increased by about 0.2 N·m. This consistent offset demonstrates that the modeling approach described herein captures the overall scale and slope of the MEC's behavior, but overestimates the initial holding torque of the MEC without any applied field. The yield stress contribution from friction and the MRF was observed to translate into only 0.1 N·m of torque. This discrepancy likely results from estimations and approximations made from the provided manufacturer data, since estimates of the yield stress at low fields may be inaccurate. Other sources of this discrepancy could arise from differences between the MRF's physical properties once shaken and poured into the MEC, and the ideal conditions assumed by the manufacturer.

The clutch assemblies disclosed herein consume several orders of magnitude less power than a traditional MRF-based clutch utilizing electromagnets for its control. In particular, relative to traditional MRF-based systems in which a continuous supply of power is needed to maintain an electromagnet in a given state, the clutch assemblies of the present disclosure require such power delivery primarily and/or only when actively varying the torque characteristics. These differences are inconsequential on the timescale of tens of milliseconds, but the power draw becomes significant the longer active operation is required. This decrease in power consumption can facilitate the use of such clutch assemblies many desirable applications, since this could significantly extend the time of remote operation and reduce energy costs. Electric vehicles or robots that currently utilize MRF clutches could significantly reduce their power consumption by adopting the principles disclosed herein, thereby improving battery life and range.

Simple calculations can demonstrate the significance of the ability to maintain any torque within an operational range without any additional power input, once such a torque value is set. For example, a single EPM may have a power consumption of about 75 W (15 V at 3Ω, drawing about 5 Amps), and can achieve maximum torque output with a switching current pulse length of 5 ms. This corresponds to a power consumption of 0.104 mWh, or 0.626 mWh for all six EPMs in the array. Switching the MEC from the off state to the on state and then back to the off state requires pulsing both directions, so to transmit maximum torque with the MEC for 1 hour and then turn it back off, the total power consumption would be about 1.25 mWh.

By contrast, other MRF-based clutch designs that utilize active electromagnets to transmit torque require supplying power to such electromagnets for the entirety of maximum (or minimum) torque transmission for 1 hour. One sample design using this modality requires about 3.5 W (see Pisetskiy, S., and Kermani, M. (2021). High-performance magneto-rheological clutches for direct-drive actuation: Design and development. *J. Intelligent Material Syst. Struct.* 32, 2582-2600. doi: 10.1177/1045389x211006902), which translates to 3,500 mWh of power consumption for maximum torque transmission.

Thus, clutch assemblies according to the present disclosure consume several orders of magnitude less energy than comparable devices for the same function (in this calculation, only 0.036% of the electromagnet-based design). Additional optimizations in manufacturing tolerances, parameter optimization, and EPM design will reduce the power and power consumption further.

The experimental results disclosed herein characterizing the real-world performance of clutch assemblies according to the present disclosure demonstrate that such clutch assemblies can transmit between 0.16 and 0.96 N·m of torque, with rapid response times (≈5-20 ms) and low power consumption (1.25 mWh). As discussed above, the arrangement of the EPMs is variable and scalable, and can be modified to a wide range of possible clutch form factors. For applications requiring greater torque, redesigning the physical parameters to incorporate more EPMs or larger, more powerful EPMs would enable greater larger MEC devices. With greater volume and surface area, it is possible to generate a greater range of transmittable torque for a given application. The MEC represents a new control strategy for MRF-based torque transmission devices and has many applications in varied robotic and automotive research areas.

In view of the many possible ways in which the principles of the disclosure may be applied, it should be recognized that the illustrated configurations depict examples of the disclosed technology and should not be taken as limiting the scope of the disclosure nor the claims. Rather, the scope of the claimed subject matter is defined by the following claims and their equivalents.

We claim:

1. A clutch assembly comprising:
   a first terminal;
   a second terminal;
   a clutch body enclosing a torque transfer fluid; and
   a plurality of electropermanent magnets (EPMs) circumferentially distributed around a central axis of the clutch assembly, each EPM configured to generate a respective EPM magnetic field that extends through the clutch body,
   wherein the clutch assembly is configured to transmit a torque between the first terminal and the second terminal with a torque capacity that is based, at least in part, on the EPM magnetic fields generated by the plurality of EPMs.

2. The clutch assembly of claim 1, wherein the torque transfer fluid comprises a magnetorheological fluid (MRF).

3. The clutch assembly of claim 1, wherein the plurality of EPMs collectively are configured to produce a total EPM magnetic flux through the clutch body, and wherein the torque capacity is based, at least in part, on the total EPM magnetic flux.

4. The clutch assembly of claim 1, wherein each EPM is configured to be selectively transitioned among a plurality of operative states including:
   (i) a fully depolarized state, in which a magnitude of the respective EPM magnetic field is a minimum EPM magnetic field magnitude;
   (ii) a fully polarized state, in which the magnitude of the respective EPM magnetic field is a maximum EPM magnetic field magnitude; and
   (iii) a plurality of intermediate polarization states, in which the magnitude of the respective EPM magnetic field is between the minimum EPM magnetic field magnitude and the maximum magnetic field magnitude.

5. The clutch assembly of claim 1, wherein the first terminal comprises one or more first terminal discs, wherein the second terminal comprises one or more second terminal discs, and wherein the torque transfer fluid extends within a torque transfer region between the one or more first terminal discs and the one or more second terminal discs.

6. The clutch assembly of claim 5, wherein the torque transfer fluid is configured to transition between an inactive state, in which the one or more first terminal discs and the one or more second terminal discs may rotate relative to one another, and an active state, in which the one or more first terminal discs and the one or more second terminal discs are coupled to one another to rotate in unison.

7. The clutch assembly of claim 5, wherein the one or more first terminal discs and the one or more second terminal discs are interleaved with one another.

8. The clutch assembly of claim 5, wherein the first terminal comprises a first terminal hub extending at least partially within the clutch body, wherein the one or more first terminal discs are fixedly coupled to the first terminal hub, and wherein the first terminal hub and the one or more first terminal discs are configured to rotate relative to the clutch body.

9. The clutch assembly of claim 5, wherein the second terminal comprises a second terminal hub extending at least partially within the clutch body, wherein the one or more second terminal discs are fixedly coupled to the second terminal hub, and wherein the second terminal hub and the one or more second terminal discs are configured to rotate relative to the clutch body.

10. The clutch assembly of claim 5, wherein the one or more second terminal discs are fixedly coupled to the clutch body.

11. The clutch assembly of claim 1, wherein each EPM comprises:
   an electromagnet comprising a magnetic core and a winding;
   a permanent magnet; and
   a pair of soft magnetic material plates interconnecting the electromagnet and the permanent magnet, and
   wherein each EPM is configured such that the respective EPM magnetic field is selectively varied by transmitting a switching current pulse through the winding.

12. The clutch assembly of claim 11, wherein the clutch body comprises:
   a first surface;
   a second surface opposite the first surface; and
   a side surface extending between the first surface and the second surface, and
   wherein, for each EPM, one soft magnetic material plate is positioned adjacent to the first surface and the other soft magnetic material plate is positioned adjacent to the second surface such that the EPM magnetic field extends between the pair of soft magnetic material plates and through the clutch body.

13. A method comprising:
transitioning each of one or more electropermanent magnets (EPMs) of a clutch assembly that comprises a plurality of EPMs distributed around a central axis to a respective EPM operative state that is one of:
  (i) a fully depolarized state, in which a magnitude of a respective EPM magnetic field is a minimum EPM magnetic field magnitude;
  (ii) a fully polarized state, in which the magnitude of the respective EPM magnetic field is a maximum EPM magnetic field magnitude; and
  (iii) an intermediate polarization state, in which the magnitude of the respective EPM magnetic field is between the minimum EPM magnetic field magnitude and the maximum magnetic field magnitude.

14. The method of claim 13, wherein the transitioning the EPMs to the respective EPM operative states comprises transitioning a subset of the EPMs to one of the fully depolarized state or the fully polarized state.

15. The method of claim 13, wherein the transitioning the EPMs to the respective EPM operative states comprises transitioning a subset of the EPMs to the intermediate polarization state.

16. The method of claim 15, wherein each EPM comprises an electromagnet with a winding and a magnetic core, and wherein the transitioning the subset of the EPMs to the intermediate polarization comprises, for each EPM in the subset of EPMs, transmitting one or more switching current pulses through the winding with a switching current pulse duration that is based, at least in part, on a target torque capacity of the clutch assembly.

17. The method of claim 16, wherein the switching current pulse duration is based, at least in part, on an initial EPM operative state of each EPM of the subset of EPMs.

18. A method comprising:
controlling each of one or more electropermanent magnets (EPMs) of a clutch assembly that comprises a plurality of EPMs distributed around a central axis to vary a total EPM magnetic flux generated by the plurality of EPMs and extending through a magnetorheological fluid of the clutch assembly.

19. The method of claim 18, wherein the controlling the EPMs comprises independently controlling an EPM magnetic field generated by each EPM.

20. The method of claim 18, wherein the clutch assembly is characterized by a torque capacity that is based, at least in part, on the total EPM magnetic flux, and wherein the controlling the EPMs comprises controlling the EPMs to generate a total EPM magnetic flux that is based, at least in part, on a target torque capacity of the clutch assembly.

21. The clutch assembly of claim 1, wherein each EPM is positioned at least partially exterior of the clutch body.

* * * * *